United States Patent [19]

Okabe et al.

[11] Patent Number: 4,697,418
[45] Date of Patent: Oct. 6, 1987

[54] CONTROL SYSTEM FOR HYDRAULICALLY-OPERATED CONSTRUCTION MACHINERY

[75] Inventors: Nobuya Okabe, Tsuchiura; Toichi Hirata, Ushiku; Kuniaki Yoshida, Tsuchiura; Genroku Sugiyama, Ibaraki; Masakazu Haga, Ibaraki; Hideaki Tanaka, Ibaraki; Akira Tatsumi, Tokyo, all of Japan

[73] Assignee: Hitachi Construction Machinery Co., Ltd., Tokyo, Japan

[21] Appl. No.: 904,118

[22] Filed: Sep. 5, 1986

[30] Foreign Application Priority Data

Sep. 7, 1985 [JP] Japan .................................. 60-196879
Oct. 26, 1985 [JP] Japan .................................. 60-239900
Jan. 8, 1986 [JP] Japan ...................................... 61-648

[51] Int. Cl.$^4$ .............................. E02F 9/20; F15B 9/04
[52] U.S. Cl. ........................................... 60/434; 60/431
[58] Field of Search .................................. 60/434, 433

[56] References Cited

U.S. PATENT DOCUMENTS 4,476,679  10/1984  Sato ........................................ 60/434

FOREIGN PATENT DOCUMENTS 0076485  4/1983  European Pat. Off. .
0159835  10/1985  European Pat. Off. .
646519   4/1964  France .

Primary Examiner—Alan Cohan
Attorney, Agent, or Firm—Antonelli, Terry & Wands

[57] ABSTRACT

A control system for a hydraulic excavator having a prime mover, revolution number control device for the prime mover, at least one variable displacement hydraulic pump driven by the prime mover, displacement volume control device for the pump, actuators driven by pressurized fluid discharged from the pump and working elements driven by the respective actuators. The control system includes maximum revolution number altering device for the prime mover associated with the revolution number control device, maximum displacement volume altering device for the pump associated with the displacement volume control devices, devices for sensing the operation condition of the actuators, devices for selecting an operation mode for each working element and control devices. The maximum revolution number altering device provides at least one maximum revolution number of the prime mover and the maximum displacement volume altering device provides at least one maximum displacement volume so that maximum revolution numbers of the prime mover and maximum displacement volumes are arranged in a plurality of combinations. The plurality of combinations are set in association with the operation condition of the actuators and the selection of the operation mode. The control means selects a combination of the maximum revolution number of the prime mover and the maximum displacement volume of the pumps on basis of output signals of the sensors and selection devices and drives the maximum revolution number altering device and the maximum displacement volume altering device to set the maximum revolution number of the prime mover and the maximum displacement volume of the hydraulic pump.

13 Claims, 44 Drawing Figures

FIG. 8

| NO. | POSITION OF SWITCH 32 | | POSITION OF SWITCH 33 | | POSITION OF PRESSURE SWITCH 34a | | POSITION OF PRESSURE SWITCH 34b | | SELECTED POSITION |
|---|---|---|---|---|---|---|---|---|---|
| | P | E | H | L | ON | OFF | ON | OFF | |
| 1 | ○ | | ○ | | ○ | | ○ | | A |
| 2 | ○ | | ○ | | | ○ | ○ | | B |
| 3 | ○ | | ○ | | ○ | | | ○ | A |
| 4 | ○ | | ○ | | | ○ | | ○ | B |
| 5 | | ○ | ○ | | ○ | | ○ | | C |
| 6 | | ○ | ○ | | | ○ | ○ | | C |
| 7 | | ○ | ○ | | ○ | | | ○ | C |
| 8 | | ○ | ○ | | | ○ | | ○ | C |
| 9 | ○ | | | ○ | ○ | | ○ | | D |
| 10 | ○ | | | ○ | | ○ | ○ | | B |
| 11 | ○ | | | ○ | ○ | | | ○ | D |
| 12 | ○ | | | ○ | | ○ | | ○ | B |
| 13 | | ○ | | ○ | ○ | | ○ | | D |
| 14 | | ○ | | ○ | | ○ | ○ | | C |
| 15 | | ○ | | ○ | ○ | | | ○ | D |
| 16 | | ○ | | ○ | | ○ | | ○ | C |

CONTROL SYSTEM FOR HYDRAULICALLY-OPERATED CONSTRUCTION MACHINERY

BACKGROUND OF THE INVENTION

This invention relates to control systems for hydraulically-operated construction machinery, and more particularly it is concerned with a control system for hydraulically-operated construction machinery, such as a hydraulic excavator of the crawler or wheel type, equipped with a prime mover and at least one variable displacement hydraulic pump driven by the prime mover to operate desired working elements through the respective actuators.

One of the typical hydraulically-operated construction machinery is a hydraulic excavator which generally comprises a prime mover or an engine, means for controlling the revolution number of the engine such as a fuel injection device equipped with an engine lever operated by the operator in the operator's cab and a governor connected to the engine lever, at least one variable displacement pump driven by the engine, means for controlling the displacement volume of the pump or a regulator, a pluraly of actuators driven by a hydraulic fluid delivered from the hydraulic pump and a plurality of working elements driven by the respective actuators. Generally, the working elements include left and right travel devices, a swing and front attachments, such as a boom, an arm and a bucket.

In the hydraulic excavator of the aforesaid construction, a control lever is provided for each one of the working elements and operated by the operator to actuate a directional control valve mounted between the hydraulic pump and the actuator for the respective working element to supply a hydraulic fluid from the hydraulic pump being driven by the engine to the corresponding actuator to drive the same, to thereby drive the respective working element for operation. In this way, the left and right travel devices are operated for travelling, the swing is operated for rotation and the various front attachments are suitably operated for performing a digging operation.

In a hydraulic excavator of the prior art, the maximum value of the revolution number of the engine controlled by the fuel injection device is generally constant and the maximum value of the hydraulic pump controlled by the regulator is constant. For example, in a case where the pump is swash-plate pump, the maximum value of the tilting angle of the swash plate is generally constant. The constant maximum revolution number and maximum displacement volume are decided so as to be able to obtain a desired maximum discharge rate at the maximum revolution number of the engine and at the same time a desired pump consumption horsepower at the maximum revolution number of the engine.

The constant maximum revolution number and maximum displacement volume are decided in such a manner that the desired maximum pump flow rate and the desired engine horsepower characteristic can be obtained. In other words, the maximum pump flow rate of the hydraulic excavator of this construction is decided by the product of the maximum revolution number and maximum displacement volume and its engine horsepower characteristic is decided by the maximum revolution number that has been set.

Meanwhile the working elements of the hydraulic excavator are each desired to do work such as travelling, rotation or digging, which is peculiar to the respective working element. However, a mode of operation of each working element, such as working speed or work volume, may greatly vary from time to time. In the travel device, for example, there are high speed and low speed travellings and in the front attachments, there are heavy digging operations in which work volume to be handled is high, light digging operations in which work volume to be handled is relatively small and fine operations in which the working speed is very low.

One of the problems encountered in the hydraulic excavator of the prior art is that, since the maximum revolution number of the engine and the maximum displacement volume of the hydraulic pump are constant as described hereinabove, difficulty is experienced for the operator to place the machine in an operation mode in which the operation speed and work volume of each working element are exactly as intended.

For example, if the maximum revolution number of the engine and the maximum displacement volume of the hydraulic pump are so that the maximum discharge rate of the pump becomes large by placing emphasis on high-speed travelling, it is possible to let the travel devices operate at a high speed but the flow rate of fluid would be too high for other working elements. When it is required to operate one of the front attachments in fine operation, it would be quite difficult to attain the fine operation and the operability of the front attachment would be lowered. Conversely, if an emphasis is placed on performing fine operations and the maximum flow rate of fluid from the pump is set at not so high level, then it would be possible to perform a fine operation satisfactorily but it would be impossible to let the excavator travel at high speed because the flow rate of fluid supplied to travel motors would be restricted.

When the maximum revolution number and the maximum displacement volume are set with an eye to achieving an engine horsepower characteristic capable of providing a high pump consumption horsepower and optimizing the maximum fluid flow rate from the pump by placing emphasis on the heavy digging, it is possible for the excavator to perform heavy digging operations at a high working speed. However, if the excavator performs light digging operations at the same working speed, the engine horsepower would partly be wasted and fuel would be unnecessary consumed, thereby increasing noises produced by the engine.

Another typical hydraulically-operated construction machinery is a hydraulic excavator of the wheel type which is substantially similar in construction to the hydraulic excavator of the crawler type except that it is equipped with pneumatic tires driven by the travel motors for rotation. In the hydraulic excavator of the wheel type, the maximum revolution number of the engine and the maximum displacement volume of the hydraulic pump are set constant as is the case with the hydraulic excavator of the crawler type.

The maximum speed of the hydraulic excavator of the wheel type is set in many cases at a relatively high value owing to the fact that this type of excavator is allowed to travel not only at the site of work but also on roads in general. In Japan, for example, the maximum speed of this type of excavator is set by law at 35 km/h. Thus the hydraulic excavator of the wheel type is required to be able to travel at a maximum speed of 35 km/h. Because roads include flat and sloping ones, it is desired that the excavator is capable of travelling at the maximum speed of 35 km/h set by law.

Thus the hydraulic excavator of the wheel type is distinct from the hydraulic excavator of the crawler type in that it has a relatively high travel speed and that it is preferably able to travel at the maximum speed of 35 km/h set by law even when it moves uphill on a sloping road where a high load is applied thereto. This distinction gives rise to problems peculiar to the hydraulic excavator of the wheel type with regard to providing a working mode intended by the operator.

Namely, if the engine horsepower characteristic is set so as to be able to obtain a high pump consumption horsepower and the maximum revolution number of the engine and the maximum displacement volume of the hydraulic pump are set so as to be able to obtain high flow rate by placing emphasis on the ability of the excavator to move uphill on a sloping road where a high load is applied thereto the excavator would suffer disadvantages in being high in fuel consumption and noise production when travelling on flat roads or performing light digging operations under a low load, because these operations require a lower pump consumption horsepower than moving uphill on a sloping road. Conversely, if the maximum revolution number of the engine and the maximum displacement volume of the hydraulic pump are set by placing emphasis on travelling on flat roads or performing ordinary digging operations, then it would be impossible to obtain necessary horsepower for moving uphill on sloping roads, making it impossible to travel at the maximum speed of 35 km/h set by law.

Meanwhile, Japanese Patent Unexamined Publication No. 135341/83 (Patent Application No. 16349/82) laid open to public inspection in Japan on Aug. 11, 1983 discloses a control system for hydraulically-operated construction machinery which is provided with means for sensing the working conditions of the actuators so that, when an actuator tending to have a high load applied thereto is sensed to be in a working condition, the revolution number of the engine is increased and the displacement volume of the hydraulic pump is reduced and, when an actuator tending to have a low load applied thereto is sensed to be in a working condition, the revolution number of the engine is reduced and the displacement volume of the hydraulic pump is increased. Thus a sudden change in the flow rate of fluid from the pump that might be caused by a change in the load is prevented to conserve energy and improve operability.

As described hereinabove, the operation mode of each working element, such as working speed and work volume, varies and hence a load applied to each actuator varies. The control system of the prior art disclosed in the publication for the hydraulic excavator has been unable to cope with such variations in the working mode. In other words, the control system of the prior art has not solved the problem raised when light digging operations are performed while the maximum value of the revolution number of the engine and the displacement volume of the hydraulic pump are set by placing emphasis on performing heavy digging operations satisfactorily, and the problem raised when the excavator travels on flat roads while they are set by placing emphasis on the excavator travelling uphill on sloping roads. Similar problems are raised when fine operations are performed after the maximum value of the revolution number of the engine and the displacement volume of the hydraulic pump are set by placing emphasis on the excavator being able to travel at high speed, because it is essentially impossible to set the maximum value of the number of revolutions of the engine and the displacement volume of the hydraulic pumps with an eye to fine operations which have a low incidence. Thus the hydraulically-operated excavator having the control system described hereinabove would have essentially the same disadvantage as conventional hydraulic excavators in that it is impossible to provide each working element with an operation mode which is desired by the operator.

SUMMARY OF THE INVENTION

This invention has as its object the provision of a control system for hydraulically-operated construction machinery capable of driving each actuator in a manner to provide each working element with an operation mode which is desired by the operator.

According to the invention, there is provided, in a control system of a hydraulically-operated construction machinery comprising a prime mover, means for controlling the revolution number of the prime mover, at least one variable displacement hydraulic pump driven by the prime mover, means for controlling the displacement volume of the pump, a plurality of actuators driven by pressurized fluid discharged from the pump and a plurality of working elements driven by the respective actuators, said control system comprising means associated with the revolution number control means for altering the maximum revolution number of the prime mover, means associated with the displacement volume control means for altering the maximum displacement volume of the hydraulic pump, means for sensing the operation condition of the actuators, means for selecting an operation mode for each working element, the maximum revolution number altering means providing at least one maximum revolution number of the prime mover and the maximum displacement volume altering means providing at least one maximum displacement volume so that maximum revolution numbers of the prime mover and maximum displacement volumes are arranged in a plurality of combinations, said plurality of combinations being set in association with the operation condition of the actuators and the selection of the operation mode, and control means for selecting a combination of the maximum revolution number and the maximum displacement volume on basis of output signals of the sensor means and selection means and driving the maximum revolution number altering means and the maximum displacement volume altering means to set the maximum revolution number of the prime mover and the maximum displacement volume of the hydraulic pump to the contents of the selected combination.

BRIEF DESCRIPTION OF THE DRAWINGS

FIG. 8 is a diagram in explanation of the combination of the maximum revolution number and maximum displacement volumes set in the processing section of the controller shown in FIG. 2 in association with the selection of an operation mode and an operation condition;

DESCRIPTION OF THE PREFERRED EMBODIMENTS

Figure 1:
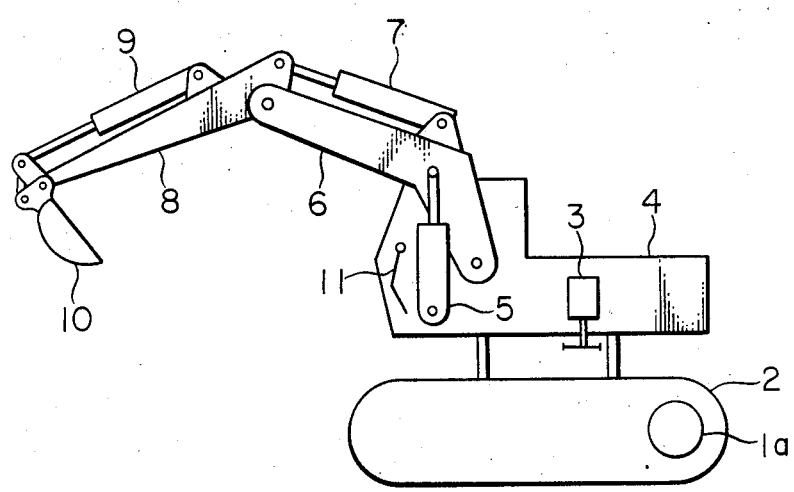
FIG. 1 is a side view of a hydraulic excavator of the crawler type in which the control system according to the invention can be incorporated.

FIG. 1 shows the hydraulic excavator of the crawler type comprising a preferred embodiment of the invention, which comprises left and right travel motors $1a$ and $1b$ (only the left travel motor $1a$ being shown in FIG. 1), left and right travel devices 2 (only the left travel device being shown in FIG. 1) driven by the left and right travel motors $1a$ and $1b$ respectively, a swing motor 3 and a swing 4 driven by the swing motor 3 for operation. A boom 6 driven by a boom cylinder 5 for pivotal movement is supported by the swing 4 and has an arm 8 driven by an arm cylinder 7 for pivotal movement. The arm 8 has a bucket 10 driven by a bucket cylinder 9 for pivotal movement. The travel motors $1a$ and $1b$, swing motor 3, boom cylinder 5, arm cylinder 7 and bucket cylinder 9 are driven for operation as control levers 11 (only one being shown in FIG. 1) mounted in an operator's cab are operated to actuate respective directional control valves (see FIG. 2).

In this specification, the motors $1a$, $1b$ and 3 and the cylinders 5, 7 and 9 are generally referred to as actuators, and the travel devices 2, swing 4, boom 6, arm 8 and bucket 10 are generally referred to as working elements. The boom 6, arm 8 and bucket 10 are also generally referred to as front attachments.

Figure 2:
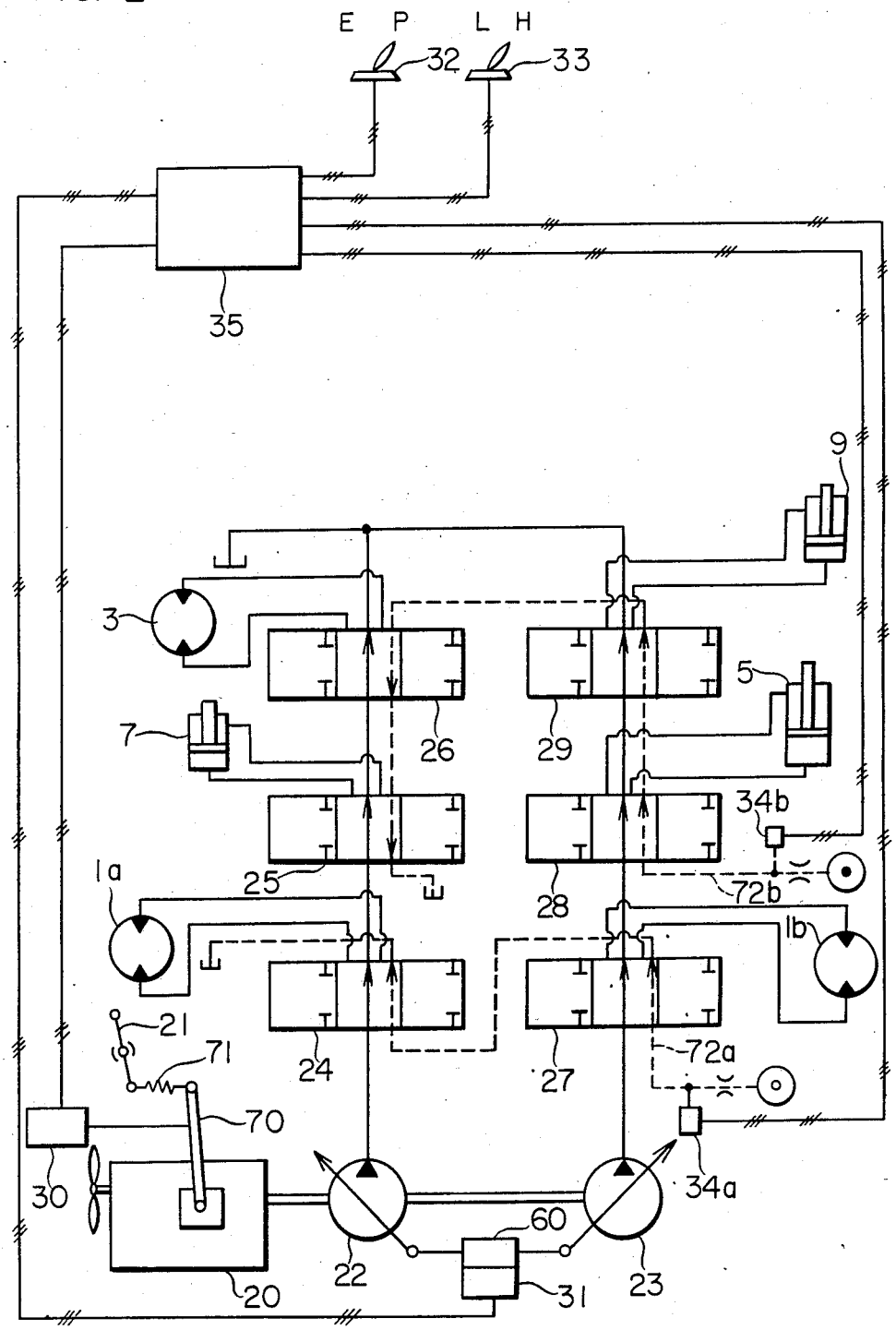
FIG. 2 is a circuit diagram of the control system of one embodiment of the invention that can be incorporated in the hydraulic excavator of the crawler type shown in FIG. 1, the control system being shown together with a hydraulic circuit.

The control system incorporated in the hydraulic excavator of the aforesaid construction is shown in FIG. 2 together with a hydraulic circuit, wherein the reference numeral 20 designates a prime mover or an engine having an engine lever 21 for controlling the revolution number thereof. The engine 20 drives variable displacement hydraulic pumps 22 and 23. The reference numeral 24 designates a first travel directional control valve for controlling the operation of the left travel motor 1a. The reference numeral 25 designates an arm directional control valve for controlling the operation of the arm cylinder 7. The reference numeral 26 designates a swing directional control valve for controlling the operation of the swing motor 3. The directional control valves 24, 25 and 26 are all connected to the variable displacement hydraulic pump 22. The reference numeral 27 designates a second travel directional control valve for controlling the operation of tne right travel motor 1b. The reference numeral 28 designates a boom directional control valve for controlling the operation of the boom cylinder 5. The reference numeral 29 designates a bucket directional control valve for controlling the operation of the bucket cylinder 9. The directional control valves 27, 28 and 29 are all connected to the variable displacement hydraulic pump 23.

In this hydraulic circuit, the variable displacement hydraulic pumps 22 and 23 are driven for operation by the engine 20, and the travel motors 1a, 1b, swing motor 3, boom cylinder 5, arm cylinder 7 and bucket cylinder 9 are selectively driven for operation as the directional valves 24–29 are suitably actuated. In this way, the travel of the travel devices 2 and the rotation of the swing 4 are carried into effect and the front attachments perform respective operations in connection with excavation.

Figure 3:
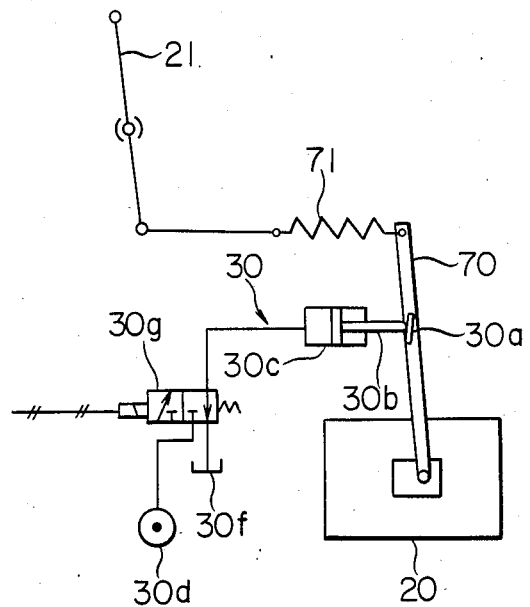
FIG. 3 is a detailed view of the maximum revolution number altering means shown in FIG. 1.

In FIG. 2, the reference numeral 70 designates a governor lever constituting revolution number control means for controlling the revolution number of the engine 20. The engine lever 21 referred to hereinabove is connected to the governor lever 70 through a spring 71. The reference numeral 30 designates maximum revolution number altering means for altering a maximum revolution number of the engine 20 controlled by a revolution number control device such as a fuel injection device and including the governor lever 70. As shown in FIG. 3, the maximum revolution number altering means 30 comprises a stopper 30a mounted on the governor lever 70, a hydraulic cylinder 30c having a piston 30b adapted to abut to the stopper 30a, a fluid source 30d connected to the hydraulic cylinder 30c and an electromatnetic control valve 30g located between the fluid source 30d and hydraulic cylinder 30c for selectively bringing the hydraulic cylinder 30c into communication with the fluid source 30d or a reservoir 30f.

Figure 4:
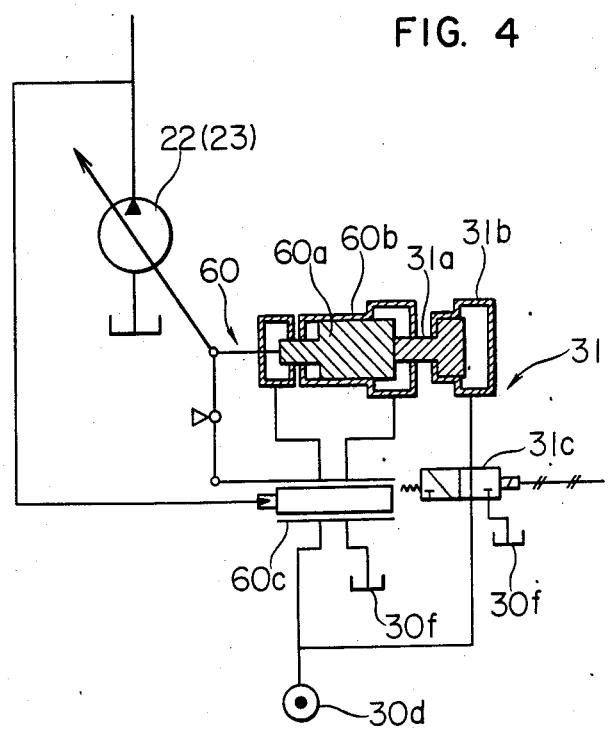
FIG. 4 is a detailed view of the maximum displacement volume altering means shown in FIG. 2.

In FIG. 2, the reference numeral 60 designates displacement volume control means or a regulator for controlling the displacement volume of the variable displacement hydraulic pumps 22 and 23 which may be the tilting angle of the swash plates when the pumps are of the swash plate type. As shown in FIG. 4, the regulator 60 comprises an actuator 60b having a piston 60a connected to the swash plates of the variable displacement hydraulic pumps 22 and 23 through a linkage, and a servo valve 60c connected to the linkage for selectively bringing the actuator 60b into communication with the fluid source 30d or the reservoir 30f. In FIG. 2, the reference numeral 31 designates maximum displacement volume altering means for altering the maximum displacement volume or the maximum tilting angle of the swash plate which is controlled by the displacement volume control means 60. As shown in FIG. 4, the maximum displacement volume altering means 31 comprises a hydraulic cylinder 31b having a piston 31a to which the piston 60a of the actuator 60b constituting the regulator 60 can be abutted, and an electromagnetic control valve 31c for selectively bringing the hydraulic cylinder 31b into communication with the fluid source 30d or the reservoir 30f.

In FIG. 2, the reference numeral 32 designates first selection means or a switch for selecting an operation mode for each working element. More specifically, the selection means 32 selects between a power mode (P-mode) suitable for the front attachments 6, 8 and 10 to perform heavy digging operations and an economy mode (E-mode) suitable for them to perform light digging operations. The reference numeral 33 designates second selection means or a switch for selecting a high-speed travelling mode (H mode) or a low-speed travelling mode (L-mode) for the travel devices 2 to travel. The reference numeral 34a designates a peressure switch for sensing whether the travel motors 1a and 1b are in operation. The reference numeral 34b is a pressure switch for sensing whether the boom cylinder 5, arm cylinder 7 or bucket cylinder 9 for driving the front attachment and the swing motor 3 for rotating the swing 4 are in operation. The pressure switches 34a and 34b are adapted to respond to pilot pressures produced in pilot passageways 72a and 72b when the directional control valves 24 and 27 or the directional control valves 25, 26, 28 and 29 are actuated.

Figure 5:
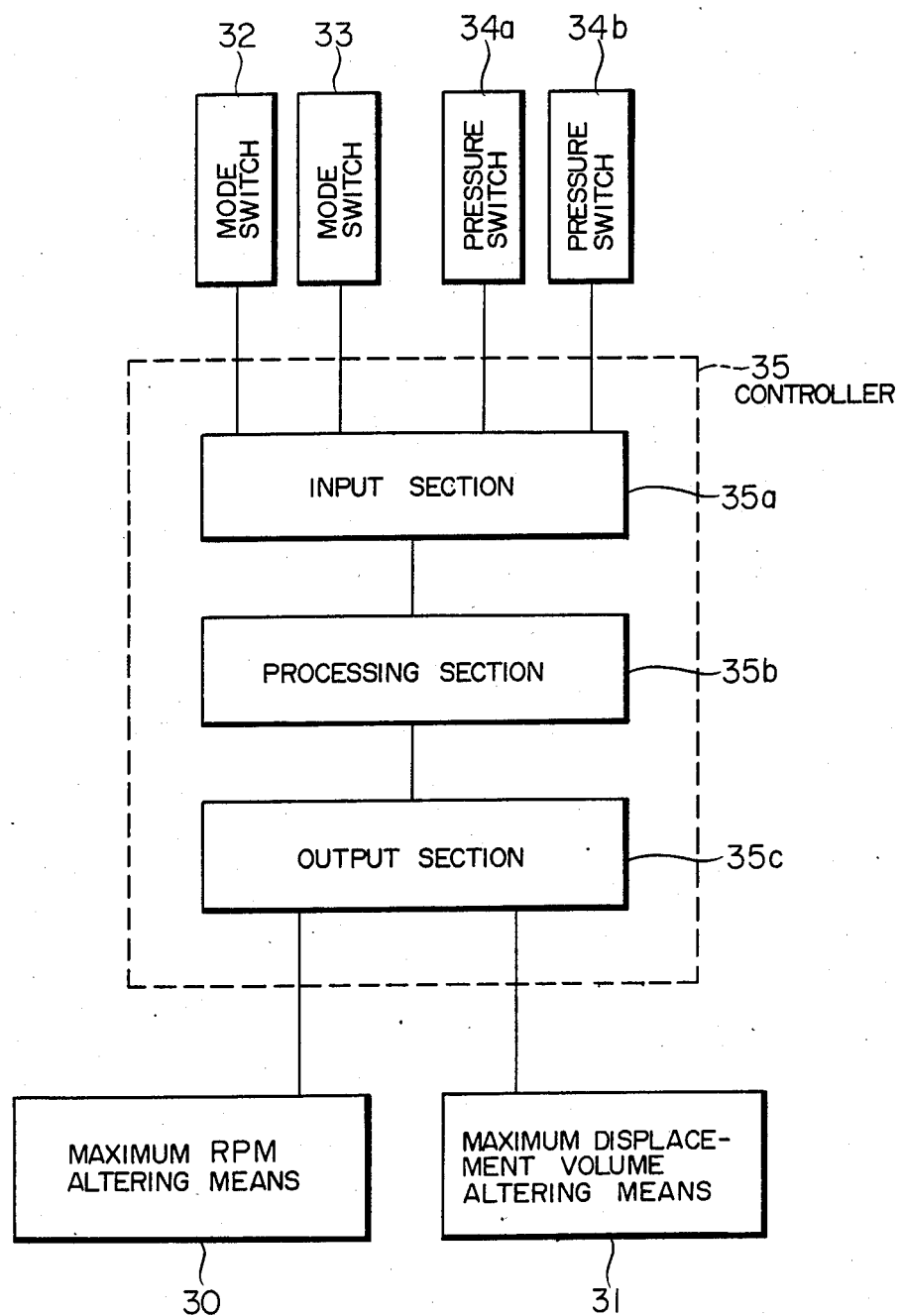
FIG. 5 is a block diagram showing the construction of the controller shown in FIG. 2.

The reference numeral 35 designates a controller to which the maximum revolution number altering means 30, maximum displacement volume altering means 31, mode switches 32 and 33 and pressure switches 34a and 34b are connected. As shown in FIG. 5, the controller 35 comprises an input section 35a to which the mode switches 32 and 33 and pressure switches 34a and 34b are connected, a processing section 35b connected to the input section 35a and constituting setting means and control means subsequently to be described and an output section 35c for outputting a value selected by the processing section 35b to a drive section of the electromagnetic control valve 30g forming a part of the maximum revolution number altering means 30 and a drive section of the electromagnetic control valve 31c forming a part of the maximum displacement volume altering means 31.

Figure 6:
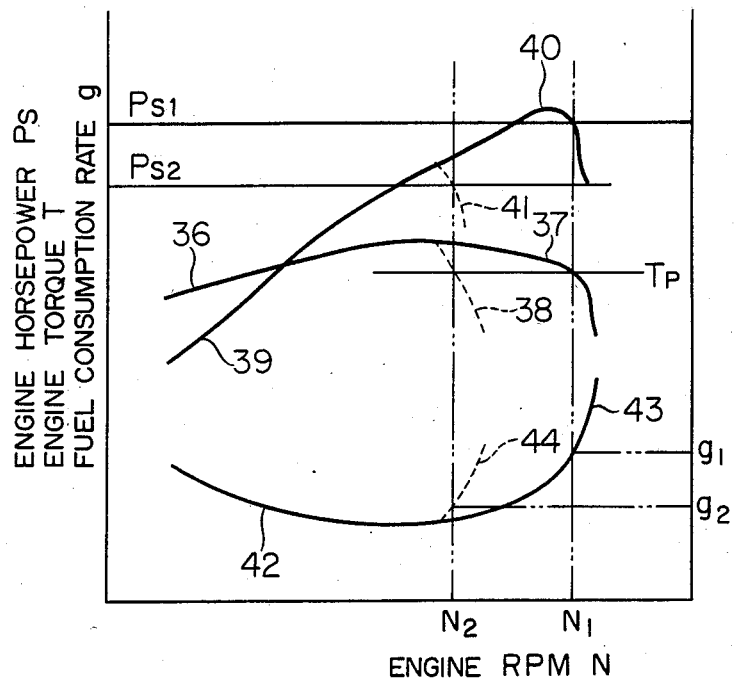
FIG. 6 is a view in explanation of the characteristics of the engine shown in FIG. 2.
Figure 7:
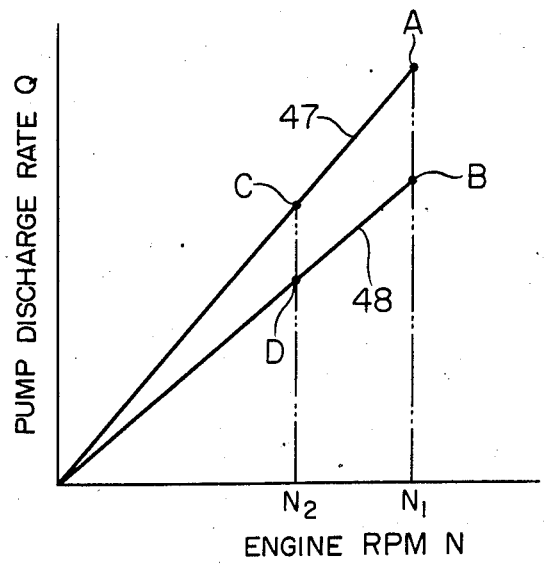
FIG. 7 is a diagrammatic representation of the combination of the maximum revolution number of the engine and the maximum displacement volume of the hydraulic pump set in the processing unit of the controller shown in FIG. 2.

FIGS. 6 and 7 are diagrammatic representations of the characteristics of the engine 20 and variable displacement hydraulic pumps 22 and 23, respectively, of this embodiment. In the diagram shown in FIG. 6, the abscissa represents the revolution number of the engine N and the ordinate indicates the engine horsepower Ps, engine torque T and fuel consumption rate g. In FIG. 6, the references $N_1$ and $N_2$ designate a first maximum revolution number which represents a higher value and a second maximum revolution number which represents a lower value, respectively. Lines 36–37, 36–38, 39–40, 39–41, 42–43 and 42–44 represent an engine revolution number-engine torque characteristic corresponding to the engine revolution number $N_1$, an engine revolution number-engine torque characteristic corresponding to the engine revolution number $N_2$, an engine revolution number-engine horsepower characteristic corresponding to the engine revolution number N1, an engine revolution number-engine horsepower characteristic corresponding to the engine revolution number N2, a fuel consumption rate characteristic corresponding to the engine revolution number N1 and a fuel consumption characteristic corresponding to the engine revolution number N2, respectively. The reference g1 denotes a fuel consumption rate obtained when the engine revolution number is N1, and g2 a fuel consumption rate obtained when the engine revolution number is N2. Lines $T_P$, $P_{s1}$ and $P_{s2}$ represent a pump torque characteristic of the variable displacement hydraulic pumps 22 and 23, a pump consumption horsepower corresponding to a larger or first maximum displacement volume q1 of the variable maximum displacement volume of the pumps 22 and 23 and a pump consumption horsepower corresponding to a smaller or second maximum displacement volume q2 of the variable maximum displacement volume of the pumps 22 and 23, respectively.

FIG. 7 is a view in explanation of a plurality of combinations of the maximum revolution number of the engine 20 and the maximum displacement volume of the pumps 22 and 23 or the maximum tilting angle of the swash plate, which are set in the processing section 35b of the controller 35. In the diagram shown in FIG. 7, the abscissa represents the revolution number N of the engine, and the ordinate indicates the discharge rate Q of the pumps. Lines 47 and 48 represent a discharge rate characteristics obtained when the maximum displacement volume of the pumps 22 and 23 is q1 and q2, respectively.

In FIG. 7, position A which is located on the line 47 representing the discharge rate characteristic obtained when the engine revolution number is N1 indicates a combination of the first maximum revolution number N1 of the engine 20 and the first maximum displacement volume q1 of the pumps 22 and 23. Position B which is disposed on the line 48 representing the discharge rate characteristic obtained when the engine revolution number is N1 indicates a combination of the first maximum revolution number N1 of the engine 20 and the second maximum displacement volume q2 of the pumps 22 and 23. Position C which is located on the line 47 representing the discharge rate characteristic ootained when the engine revolution number is N2 indicates a combination of the second maximum revolution number N2 of the engine 20 and the first maximum displacement volume q1 of the pumps 22 and 23. Position D which is disposed on the line 48 representing the discharge rate characteristic obtained when the engine revolution number is N2 indicates a combination of the second maximum revolution number N2 of the engine 20 and the second displacement volume q2 of the pumps 22 and 23.

A plurality of combinations of maximum revolution number of the engine and maximum displacement volume of the pumps are set in the processing section 35b of the controller 35. Each combination consists of one maximum revolution number achievable by the maximum revolution number altering means 30 and one maximum displacement volume achievable by the maximum displacement volume altering means 31. The combinations differ from each other in at least one of the values of maximum revolution number and maximum displacement volume. That is, in the embodiment shown, four combinations represented by positions A, B, C and D shown in FIG. 7 are set beforehand in the processing section 35b in association with the operation conditions of the actuators, namely, the operation conditions of the travel motors 1a and 1b and the other actuators 3, 5, 7 and 9 and the operation modes of the working elements, namely, the power mode (P-mode), economy mode (E-mode), high-speed travelling mode (H-mode) and low-speed travelling mode (L-mode). Any one of the combinations of the maximum revolution number of the engine and the maximum displacement volume of the pumps corresponding to the operation condition is selected based on the output signals of the pressure switches 34a and 34b and the mode switches 32 and 33, so as to drive the maximum revolution number altering means 30 and maximum displacement volume altering means 31 to bring the maximum revolution number and maximum displacement volume to the selected values.

FIG. 8 shows a table containing a variety of combinations set in the processing section 35b. When the travel motors 1a and 1b are in operation, that is, when the pressure switch 34a is ON, one of the three combinations A, C and D is selected in accordance with the operation mode, namely, a high-speed travelling mode or a low-speed travelling mode selected by the mode switch 33 regardless of whether the pressure switch 34b is ON or OFF. When the other actuators only are in operation, one of the two combinations B and C is selected in accordance with the operation mode, namely, the power mode or the economy mode selected by the mode switch 32. By selecting a suitable combination. it is possible to obtain not only a desired travelling speed and a desired work volume when digging operation but also safety of the travel when the travel and the other work are conducted at the same time because an operation mode is set primarily with an eye to the safety of travel.

Figure 9:
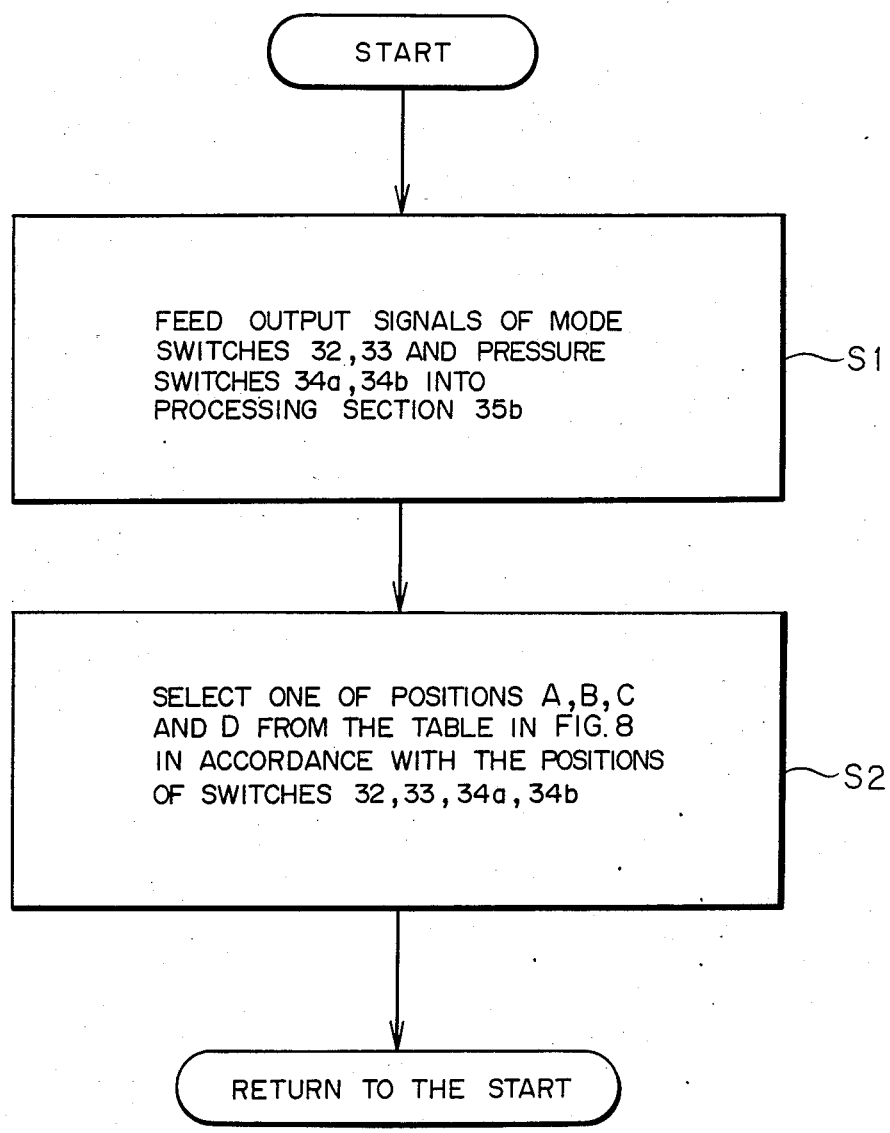
FIG. 9 is a flow chart in explanation of the operation performed by the controller shown in FIG. 2.

In the embodiment of the control system of this construction, one of the P-mode and E-mode is selected by the mode switch 32, and one of the H-mode and L-mode is selected by the mode switch 33. At the same time, the pressure switch 34a senses whether or not the travel motors 1a and 1b are in operation and the pressure switch 34b senses whether or not the actuators for driving the front attachments and the swing motor (hereinafter merely front attachments in the interest of brevity) are in operation. In step S1 shown in FIG. 9, output signals of the switches are fed into the processing section 35b via the input section 35a of the controller 35. Then, in step S2, the processing section 35b selects from the table shown in FIG. 8 a combination which corresponds to one of the positions A-D and supplies signals corresponding to the maximum revolution number of the engine 20 and the maximum displacement volume of the pumps 22 and 23, namely, the tilting angle of the swash plate which represent the selected combination to the output section 35c The output section 35c supplies a signal corresponding to the maximum revolution number of the engine 20 to the electromagnetic control valve 30g shown in FIG. 3 which constitutes the maximum revolution number altering means 30 and a signal corresponding to the maximum tilting angle of the swash plate to the electromagnetic control valve 31c shown in FIG. 3 which constitutes the maximum displacement volume altering means 31.

When the maximum revolution number is the larger value (first maximum revolution number), the electromagnetic control valve 30g is kept in the condition shown in FIG. 3 in which the hydraulic cylinder 30c is maintained in communication with the reservoir 30f to allow the piston 30b to move freely. This allows the governor lever 70 to move in pivotal movement through a large angle corresponding to the full stroke of the piston 30b, thereby providing the greater maximum revolution number. When the maximum revolution number is the smaller volume (second maximum revolution number), the electromagnetic control valve 30g is shifted to a left position in FIG. 3, so that the pressurized fluid in the fluid source 30d is supplied to the hydraulic cylinder 30c and the piston 30b is held in a right position for free movement. The stopper 30a is engaged to the piston 30b, so that the governor lever 70 has its angle of pivotal movement restricted, thereby the smaller maximum revolution number being provided.

When the maximum displacement volume or the tilting angle of the swash plate is the larger value (first maximum displacement volume), the electromagnetic control valve 31c is shifted to a position as shown in FIG. 4 to allow the hydraulic cylinder 31b to communicate with the reservoir 30f and allow the piston 31a to move freely.

This allows the piston 60a of the actuator 60b constituting the displacement volume control means 60 to move over a great distance corresponding to the full stroke of the piston 31a, thereby providing the larger maximum tilting angle. When the maximum tilting angle of the swash plate is the smaller value (second maximum displacement volume), the electromagnetic control valve 31c is kept in a position shown in FIG. 4, so that the pressurized fluid in the hydraulic cylinder 30d is supplied to the hydraulic cylinder 31b, thereby the piston 31a being unmovably held at a left position. Thus the piston 60a of the actuator 60b is engaged with the piston 31a and is limited to move, thereby the smaller tilting angle being provided.

One example of allowing the working elements to operate in a desired operation mode by selecting the values set in the processing section 35b as described hereinabove will be described. Assume that, as shown in No. 2 in the table shown in FIG. 8, the pressure switch 34b for sensing the operation of the actuators for driving the front attachments is ON and the pressure switch 34a for sensing the operation of the travel motors 1a and 1b is OFF in a condition where the P-mode suitable for the heavy digging operations has been selected by means of the mode switch 32 and the H-mode has been selected by means of the mode switch 33 for high-speed travel. In this case, the content of the position B of all the combinations set in the processing section 35b is selected. That is, the first maximum revolution number N1 of the engine 20 and the second maximum tilting angle q2 of the swash plate of the variable displacement hydraulic pumps 22 and 23 are selected, thereby allowing a discharge pressure P - pump discharge rate Q characteristic represented by a characteristic line 49 shown in FIG. 10 to be obtained. At this time, the maximum discharge flow rate $Q_P$ is $Q_P = N_1 \times q_2$. Assume, also, that as shown in No. 6 in the table shown in FIG. 8, the pressure switch 34b for sensing the operation of the actuators for driving the front attachments is ON and the pressure switch 34a for sensing the operation of the travel motors 1a and 1b is OFF in a condition where the E-mode suitable for light digging operations has been selected by means of the mode switch 32 and the H-mode has been selected by means of the mode switch 33. In this case, the content of the position B of all the combinations set in the processing section 35b is selected. That is, the first maximum revolution number N1 of the engine 20 and the second maximum tilting angle q2 of the pumps 22 and 23 are selected, thereby allowing a discharge pressure P-pump discharge flow rate Q characteristic represented by a characteristic line 50 shown in FIG. 10 to be obtained. The maximum discharge flow rate $Q_E$ is $Q_E = N_2 \times q_1$ at this time. The references 49a and 50 are engine horsepower ($P_{s1}$, $P_{s2}$) characteristic lines corresponding to the characteristic lines 49 and 50, respectively in FIG. 10.

Thus, when the P-mode is selected, the maximum revolution number of the engine 20 is increased and the maximum tilting angle of the swash plate of the variable displacement hydraulic pumps 22 and 23 is reduced to obtain a great deal of work volume with a maximum flow rate $Q_P$. When the E-mode is selected, the maximum revolution number of the engine 20 is reduced and the maximum tilting angle of the swash plate of the pumps 22 and 23 is increased to obtain a small amount of work volume with the maximum discharge flow rate $Q_E$ which is substantially equal to $Q_P$.

Particularly when the E-mode is selected, it is possible to obtain a desired amount of work volume by limiting the maximum revolution number of the engine 20 to a small value. As a result, the fuel consumption characteristic line 42–43 shown in FIG. 6 shifts to a line 42–44 and the fuel consumption rate is reduced from g1 to g2, enabling fuel saving to be achieved. Noises produced by the engine 20 are also reduced at this time because the maximum revolution number thereof is small, thereby extending the service life of the engine 20 and pumps 22 and 23.

Another example will be described. Assume that, as shown in No. 3 in the table shown in FIG. 8, the pressure switch 34a for sensing the operation of the travel motors 1a and 1b is ON and the pressure switch 34b for sensing the operation of the actuators for driving the front attachments for operation is OFF in a condition where the H-mode for high-speed travelling has been selected by means of the mode switch 33 and the P-mode has been selected by the mode switch 32. In this case, the content of the position A of all the combinations set in the processing section 35b is selected. That is, the first maximum revolution number N1 of the engine 20 and first maximum displacement volume q1 of the swash plate of the variable displacement hydraulic pumps 22 and 23 are selected thereby allowing a discharge pressure P-pump discharge flow rate Q characteristic represented by a characteristic line 51 shown in FIG. 11 to be obtained. At this time, the maximum discharge flow rate $Q_H$ is $Q_H = N_1 \times q_1$. Assume also that, as shown in No. 15 in the table shown in FIG. 8, the pressure switch 34a for sensing the operation of the travel motors 1a and 1b is ON and the pressure switch 34b for sensing the operation of the actuators for driving the front attachments for operation is OFF in a condition where the L-mode for low-speed travel has been selected by means of the mode switch 33 and the E-mode has been selected by means of the mode switch 32. In this case, the content of the position D of all the combinations set in the processing section 35b is selected. That is, the second maximum revolution number $N_2$ of the engine 20 and the second maximum displacement volume q2 of the swash plate of the pumps 22 and 23 are selected, thereby allowing a P-Q characteristic represented by a characteristic line 52 shown in FIG. 11 to be obtained. At this time, the discharge flow rate $Q_L = N_2 \times q_2$ is obtained which is sufficiently lower than $Q_H$. The numeral 51a in FIG. 11 designates a pressure of the fluid obtained when the excavator is travelling.

By using the combination of different maximum values of the engine revolution number and the tilting angle of the swash plate of the pumps, it is possible to allow the excavator to travel at high speed when moving on a broad road and to travel at low speed when the excavator moves on a narrow road or moves with supporting an object gripped by or hanging from a forward end of a front attachment, without any trouble.

Still another example will be described. Assume also that, as shown in No. 9 in the table shown in FIG. 8, the pressure switch 34a for sensing the operation of the travel motors 1a and 1b is ON and the pressure switch 34b for sensing the operation of other actuators than the travel motors is also ON in a condition where the L-mode has been selected for low-speed travelling by means of the mode switch 33 and the P-mode has been selected by means of the mode switch 32. In this case, the content of the position D of all the combinations set in the processing section 35b is selected. That is, the second maximum revolution number $N_2$ of the engine 20 and the second maximum displacement volume q2 of the swash plate are selected, thereby allowing a P-Q characteristic represented by a characteristic line 52 shown in FIG. 11 to be obtained. At this time, the maximum discharge flow rate $Q_L = N_2 \times q_2$. In spite of other actuators than the travel motors 1a and 1b being in operation and the P-mode being selected, it is possible to let the excavator travel at low speed in accordance with the selected L-mode.

It will be appreciated that when the excavator prerforms a compound operation in which an excavation operation is performed while the excavator travels, it is always possible to obtain a travelling speed suitable for travel, ensuring that the travel of the excavator is quite safe and free from trouble.

In the embodiment of the invention shown and described hereinabove, a plurality of maximum revolution numbers of the engine 20 suitable for the standardized operation modes of the working elements and a plurality of maximum tilting angles of the swash plate of the variable displacement pumps 22 and 23 are set in a plurality of combinations in the controller 35 and a desired combination is selected by the processing section 35b of the controller 35. This allows the working elements to operate in operation modes which are desired by the operator without adversely affecting the fuel consumption rate, thereby enabling the operation efficiency to be improved while achieving economy in operation and ensuring that a compound operation involving the travel of the excavator and the operation of a working element is performed smoothly without any trouble.

Figure 12:
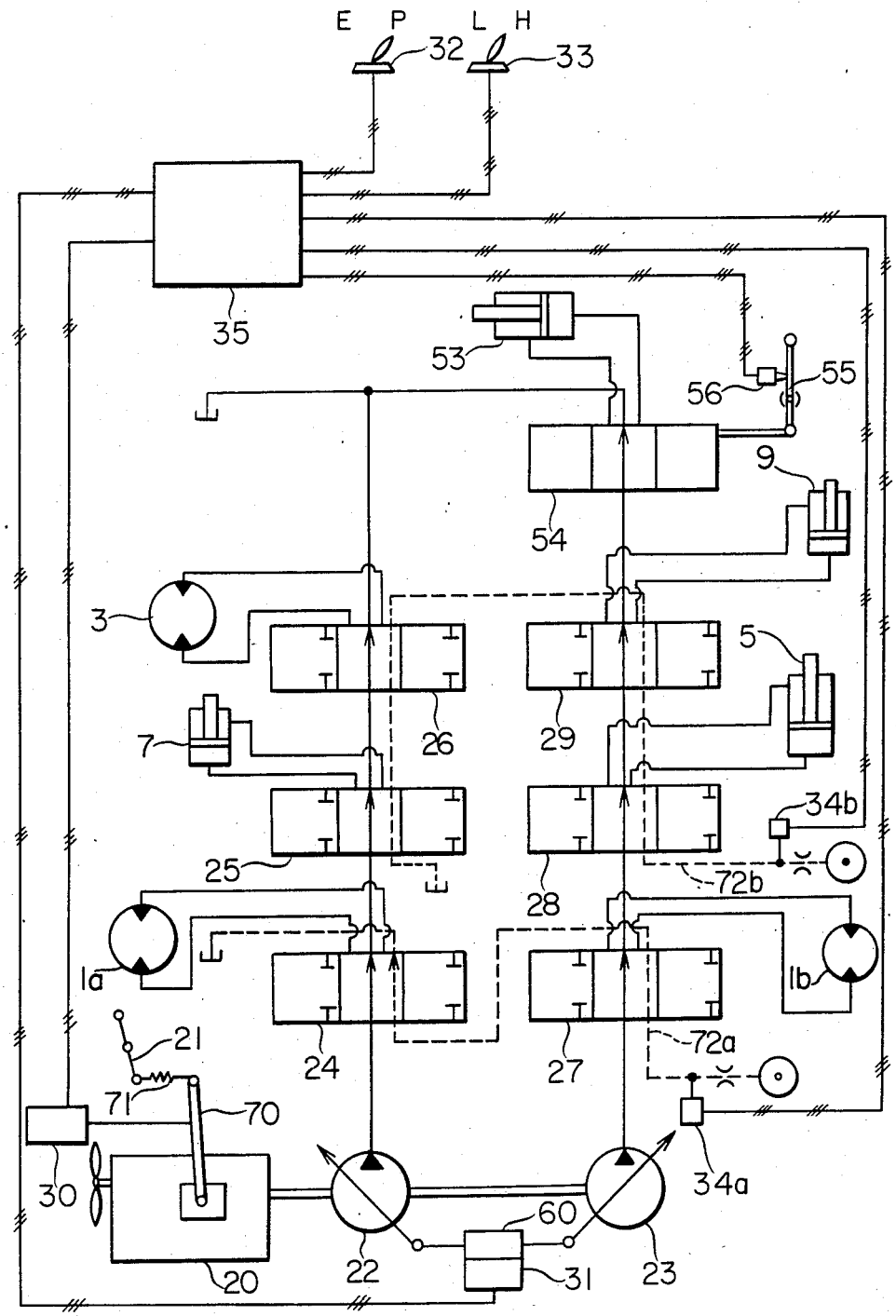
FIG. 12 is a circuit diagram of the control system comprising another embodiment of the invention.

FIG. 12 is a circuit diagram of another embodiment of the control system according to the invention. This embodiment is suitable for use with a hydraulic excavator requiring a large fluid flow rate for the actuators and front attachments and comprising, for example, a breaker 53 for crushing rocks and stones. The control system comprises a directional control valve 54 located downstream of the directional control valve 29 for the bucket for controlling the operation of the breaker 53, and a switch 56 for sensing the movement of a lever 55 for operating the directional control valve 54. The switch 56 is connected to the input section 35a of the controller 35. Other parts of the control system are similar to those of the embodiment shown in FIG. 2.

Figure 13:
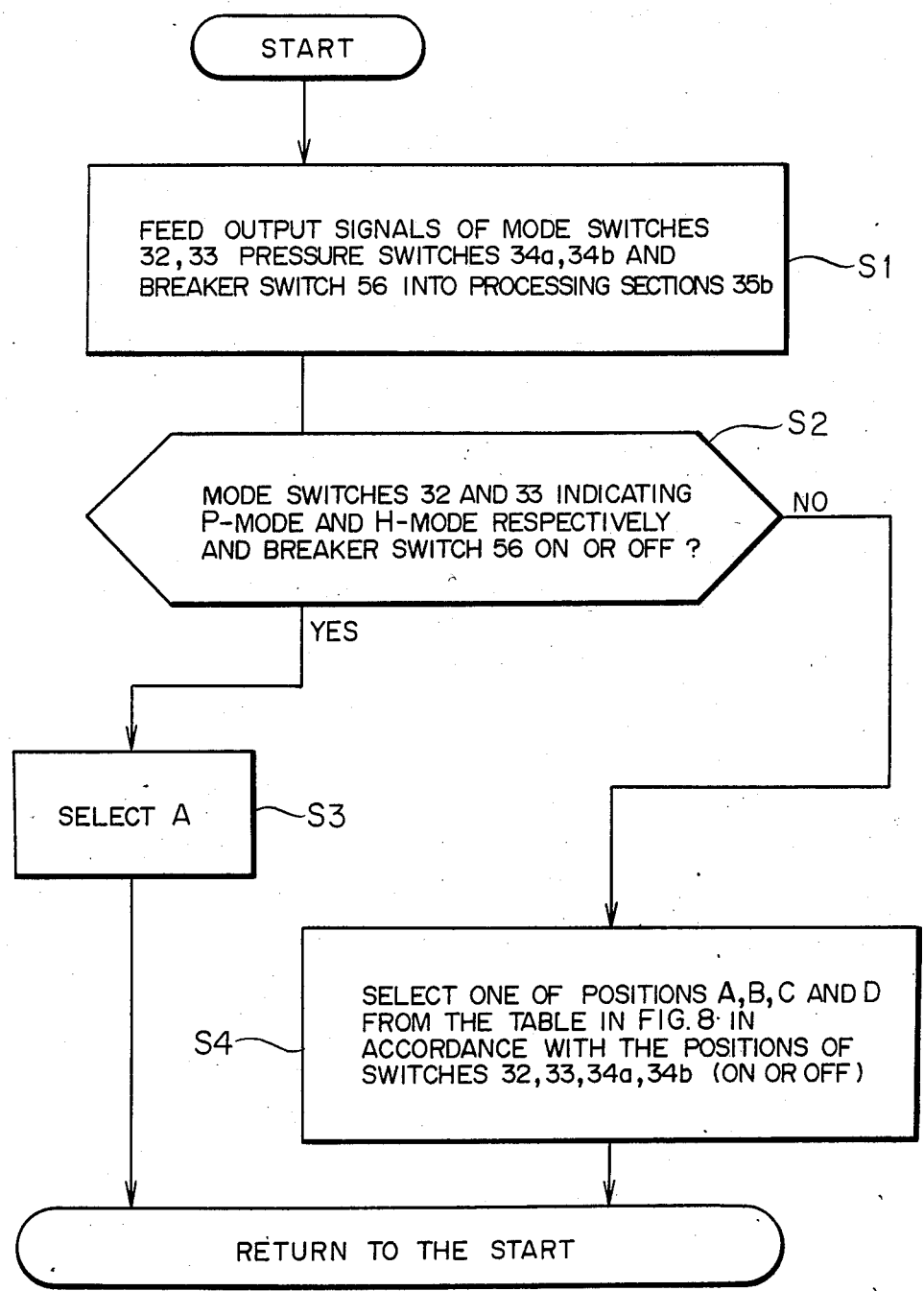
FIG. 13 is a flow chart in explanation of the operation performed by the controller shown in FIG. 12.

The processing section 35b of the controller 35 operates such that when the lever 55 is operated and a signal is supplied from the switch 65 to the input section 35a of the controller 35 in a condition where the mode switch 32 and the mode switch 33 have been switched to the P-mode and the H-mode, respectively, as shown in FIG. 13 in steps S2 and S3, it selects the combination of the position A of all the combinations set beforehand which are defined by the positions A, B, C and D. That is, the combination of the first maximum revolution number N1 of the engine and the first maximum tilting angle q1 of the swash plate of the variable displacement hydraulic pumps 22 and 23 and outputs their values to the maximum revolution number altering means 30 and maximum tilting angle altering means 31, respectively, through the output section 35c.

In the embodiment of the aforesaid construction shown in FIG. 12, it is possible to supply a pressurized fluid at a large flow rate to the breaker 53 when operations are performed for crushing rocks and stones, thereby enabling the operations to be performed with a high degree of efficiency as desired by the operator.

Figure 14:
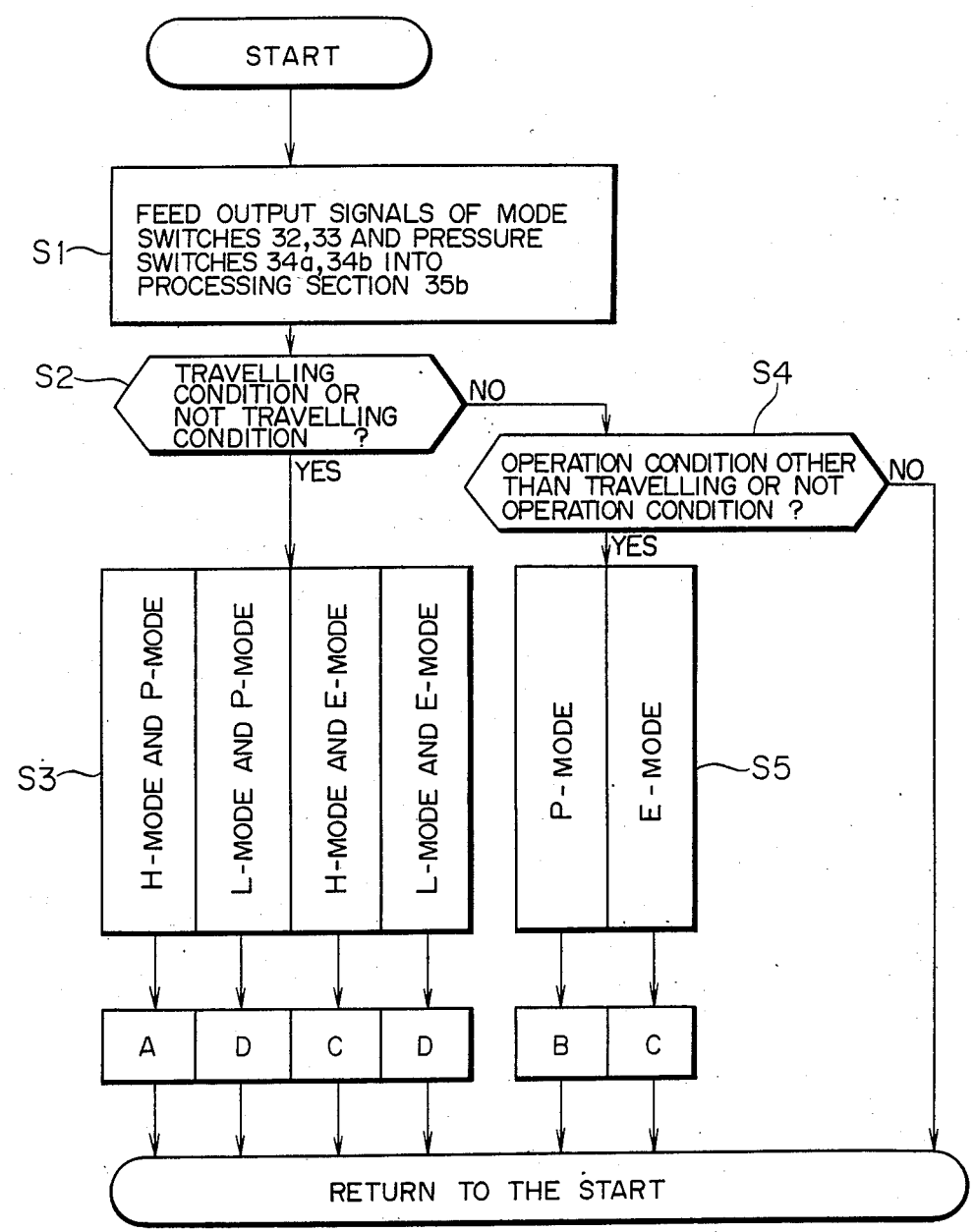
FIG. 14 is a flow chart in explanation of the operation of the control system comprising still another embodiment of the invention.

Still another embodiment of the invention will be described by referring to FIG. 14 in which control means constituted by the processing section 35b is distinct from that constituted by the processing section 35b of the first embodiment shown in FIG. 2. More specifically, the combinations A, B, C and D are set in the processing section 35b and the processing section 35b operates, like the corresponding part of the embodiment shown in FIG. 2, such that when the travel motors 1a and 1b are in operation, one of the first, third and fourth combinations A, C and D shown in FIG. 7 is selected in accordance with the operation mode (high-speed travelling mode or low-speed travelling mode) selected by the mode switch 33 regardless of the operation conditions of other actuators 3, 5, 7 and 9, and that when the other actuators than the travel motors 1a and 1b are in operation, one of the second and third combinations B and C shown in FIG. 7 is selected in accordance with the operation mode (P-mode or E-mode) selected by the mode switch 32. In addition, the processing section 35b of the embodiment shown in FIG. 14 is provided with first determining means for determining with top priority by an output signal of the pressure switch 34a whether or not the travel motors 1a and 1b are in operation, and a second determining means for determining by an output signal of the pressure switch 34b whether or not other actuators are in operation only after the first determining means determines that the travel motors 1a and 1b are not in operation. Based on the results achieved by the two determining means and the output signals of the mode switches 32 and 33, the processing section 35b selects a corresponding combination from a plurality of combinations each consisting of a maximum revolution number and a maximum displacement volume.

The control means constituted by the processing section 35b will be described in further detail by referring to the flow chart shown in FIG. 14. In step S1, output signals of the mode switches 32 and 33 and output signals of the pressure switches 34a and 34b are fed into the processing section 35b of the controller 35 via the input section 35a. Thus, in step S2, the processing section 35b determines with top priority whether or not a signal has been outputted by the pressure switch 34a, for example, and the travel motors 1a and 1b have been rendered operative. When it is determined that the travel motors 1a and 1b are in operation, the operation shifts to step S3 in which the most suitable combination of the three combinations A, C and D shown in FIG. 7 set beforehand with regard to travelling is selected in accordance with the operation modes (H-mode, L-mode, P-mode and E-mode) selected by the mode switches 32 and 33.

Figure 11:
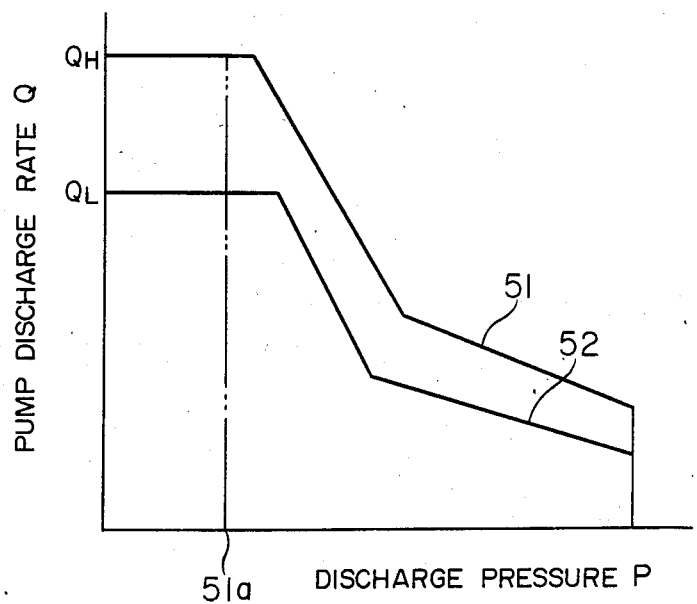
FIG. 11 is a diagrammatic representation of the P-Q characteristic of the hydraulic pump established in a high-speed travelling mode and a low-speed travelling mode.

When the H-mode and P-mode are selected by the mode switches 33 and 32 respectively, for example, position A is selected and the content of position A, namely, the first maximum revolution number N1 of the engine 20 and first maximum displacement volume q1 of the swash plate of the variable displacement hydraulic pumps 22 and 23 are selected, thereby providing the discharge pressure P-pump discharge flow rate Q characteristic represented by the characteristic line 51 shown in FIG. 11 as is the case with the first embodiment shown in FIG. 2. At this time, the maximum discharge flow rate $Q_H$ is $Q_H = N_1 \times q_1$. The pressure of the fluid on travelling is as indicated by 51a in FIG. 11.

When the L-mode and P-mode are selected by the mode switches 33 and 32 respectively in step S3, position D is selected and the content of position D, namely, the second maximum revolution number N2 of the engine and the second maximum tilting angle q2 of the swash plate of the variable displacement hydraulic pumps 22 and 23 are selected, thereby providing the P-Q characteristic represented by the characteristic line 52 shown in FIG. 11. At this time, the maximum discharge flow rate $Q_L$ is $Q_L = N_2 \times q_2$ which is sufficiently lower than $Q_H$.

Figure 10:
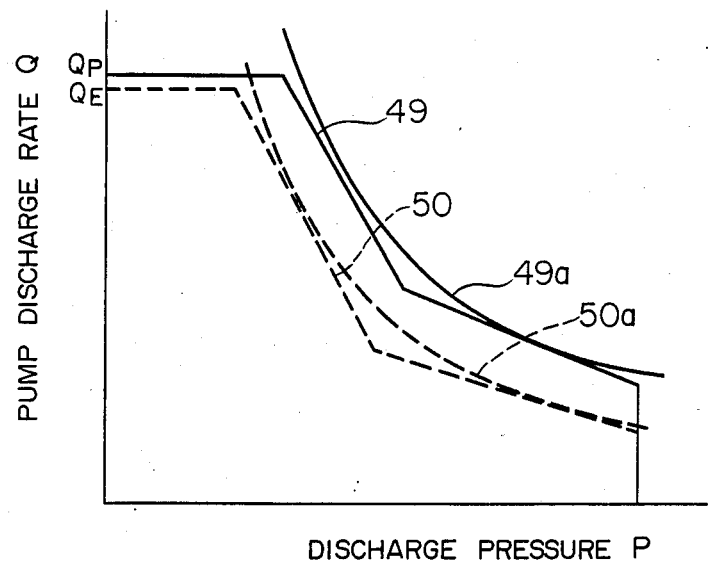
FIG. 10 is a diagrammatic representation of the relation between the discharge pressure (P) and the discharge rate (Q) of the hydraulic pump established in a power mode operation and an economy mode operation performed in the embodiment shown in FIG. 2.

When the H-mode and E-mode are selected by the mode switches 33 and 32 respectively in step S3, position C is selected and the content of position C, namely, the second maximum revolution number N2 of the engine 20 and the first maximum tilting angle q1 of the swash plate of the variable displacement hydraulic pumps 22 and 23 are selected, thereby providing the P-Q characteristic represented by the characteristic line 50 shown in FIG. 10. At this time, the maximum flow rate $Q_E$ is $Q_E = N_2 \times q_1$.

When the L-mode and E-mode are selected by the mode switches 33 and 32 respectively in step S3, position D is selected and the content of position D is selected in the same manner as the L-mode and P-mode are selected. At this time, the maximum discharge flow rate $Q_L$ is $Q_L = N_2 \times q_2$ which is sufficiently low.

In the flow chart shown in FIG. 14, the operation returns to the beginning after step S3. When no signal is supplied from the pressure switch 34a in step S2 and consequently it is determined that the excavator is not travelling, the operation moves to step S4 in which it is determined by the processing section 35b whether or not other actuators than the travel motors 1a and 1b are in operation or whether or not a signal is produced by the pressure switch 34b and other actuators than the travel motors 1a and 1b are in operation. The operation moves to step S5 when other actuator than the travel motors 1a and 1b is in operation. In step S5, a corresponding combination of the combinations of positions B and C shown in FIG. 7 set beforehand in the processing section 35b in association with other operations than travelling is selected in accordance with the operation mode (P-mode or E-mode) selected by the mode switch 32.

When, for example, the P-mode is selected by the mode switch 32, position B is selected and the content of position B, namely, the first maximum revolution number N1 of the engine 20 and the maximum tilting angle q2 of the swash plate of the variable displacement hydraulic pumps 22 and 23 are selected, thereby providing the discharge pressure P-pump discharge flow rate Q characteristic represented by the characteristic line 49 shown in FIG. 10. At this time, the maximum discharge flow rate $Q_P$ is $Q_P = N_1 \times q_2$.

When the E-mode is selected by the mode switch 32 in step S5, position C is selected. In this case, the same P-Q characteristic as obtained with the H-mode and E-mode in step S3 is obtained. At this time, the maximum discharge flow rate $Q_E$ is $Q_E = N_2 \times q_1$.

After step S5, the operation returns to the beginning. When no other actuators than the travel motors 1a and 1b are in operation in step S4, that is, when the excavator is not travelling and other actuators than the travel motors 1a and 1b are not in operation, the operation returns to the beginning.

In the embodiment described by referring to FIG. 14, the operation modes are set with an eye to travelling, and it is determined with top priority whether or not the excavator is travelling. This simplifies the processing of information and allows a corresponding combination to be instantly selected. Thus, this embodiment enables the excavator to travel at a speed which is stabilized, so that higher safety is ensured in a combined operation in which at least one of the working elements is rendered operative while the excavator is travelling.

Figure 15:
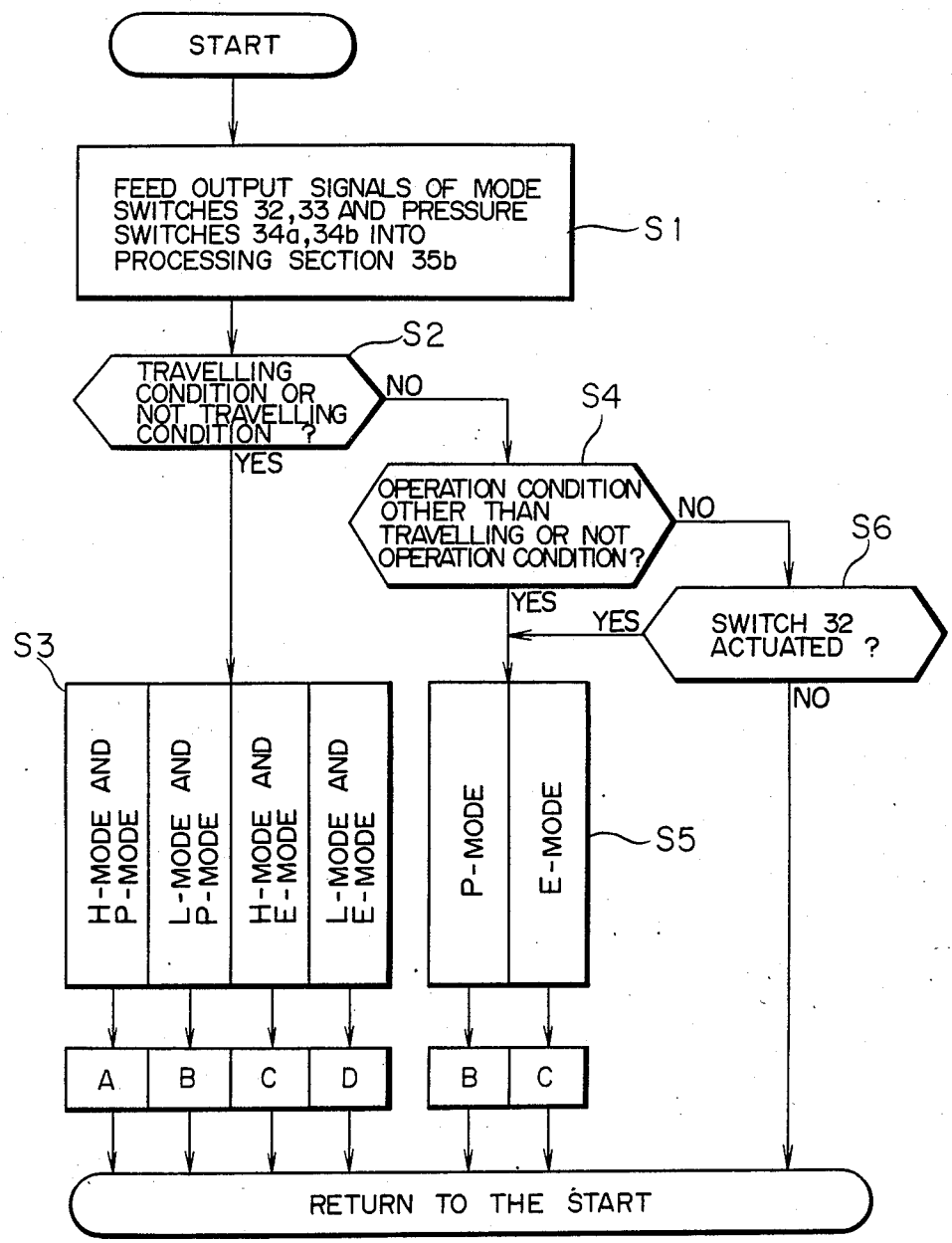
FIG. 15 is a flow chart in explanation of the operation of the control system comprising still another embodiment of the invention.

Still another embodiment of the control system according to the invention will be described by referring to FIG. 15, in which the control means constituted by the processing section 35b of the controller 35 shown in FIG. 5 is distinct from the control means constituted by the processing section 35b of the first embodiment shown in FIG. 2. The control means of the processing section 35b of the embodiment which will be described by referring to FIG. 15 comprises, in addition to the first and second determining means, a third determining means for determining whether or not the mode switch 32 has been actuated after it has been determined by the second determining means that other actuators 3, 5, 7 and 9 than the travel motors 1a and 1b are not in operation. When it is determined by the third determining means that the mode switch 32 has been operated, the same combination is selected as selected when it is determined by the second determining means that other actuators than the travel motors 1a and 1b are in operation.

The control means of this embodiment will be described in detail by referring to the flow chart shown in FIG. 15. The control means of this embodiment is similar to the control means of the embodiment shown in FIG. 14 in that, in step S2, it is determined to be in a travelling condition; in step S3, one of the three combinations of A, C and D shown in FIG. 7 is selected in accordance with the operation mode selected from the H-mode, L-mode, P-mode and E-mode and in step S2, it is determined not to be in a travelling condition; in step S4, other actuators than the travel motors 1a and 1b are determined to be in operation; and in step S5, one of the two combinations of B and C shown in FIG. 7 is selected in accordance with the P-mode or the E-mode that has been selected.

The operation moves to step S6 when it is determined in step S4 that other actuators than the travel motors are not in operation, that is, the excavator is not travelling and other actuators than the travel motors 1a and 1b are not in operation. In step S6, it is determined by the second determining means of the processing section 35b whether the mode switch 32 has been actuated, that is, whether a signal supplied by the mode switch 32 has changed from a P-mode indication signal which is a previous indication signal to an E-mode indication signal or from an E-mode signal to a P-mode signal. When the determination made in step S6 is satisfied, for example, when the switch 32 is actuated in preparation for a digging operation, the operation moves to step S5. In step S5, the position B or C corresponding to the P-mode or E-mode that has been selected by the switch 32 is selected, to thereby provide the maximum flow rate $Q_P = N1 \times q2$ or the maximum flow rate $Q_E = N2 \times q1$ in accordance with the combination B or C. When the determination made in step S6 is not satisfied, the operation returns to the beginning.

In the embodiment constructed as described hereinabove, it is possible to select the operation mode of other actuators by the mode switch 32, that is, select the combination of the maximum revolution number and the maximum displacement volume corresponding to the position B or C in accordance with the P-mode or E-mode that has been selected, in preparation for performing a digging operation in the P-mode or E-mode. Thus, the operator becomes aware of a change in the number of revolutions of the prime mover or a change in the sound produced by the rotating prime mover, and no change is produced in the combination of the maximum revolution number and the maximum displacement volume when a heavy digging or light digging operation is started.

That is, it is possible, by changing the selection made by the first selection means, to provide a combination of the maximum revolution number of the prime mover and the maximum displacement volume of the hydraulic pumps suitable for an operation performed by other actuators than the travel motors before the operation commences. When the selection made by the first selection means is changed, the operator becomes aware of a change in the sound of the rotating prime mover, so that he can obtain a good feeling for operating the prime mover. Because no change occurs in the combination of the maximum revolution number and the maximum displacement volume when the operation commences, the operator has no strange feeling which he might otherwise have when a change occurs. This ensures that operations are performed smoothly.

Still another embodiment of the invention will be described by referring to FIG. 16 in which control means constituted by the processing section 35b of the controller 35 is distinct from that constituted by the processing section 35b of the first embodiment shown in FIG. 2. More specifically, the control means of the processing section 35b shown in FIG. 16 comprises, in addition to the parts shown in FIG. 14, means, such as a timer, for measuring the time during which the determination made by the second determining means that other actuators 3, 5, 7 and 9 are not in operation is sustained after the determination has been mode, and a third determining means for determining based on an output signal of the measuring means whether or not the determination made by the second determining means has been sustained for a predetermined period of time. When it is determined by the third determining means that the predetermined period of time has not elapsed, the same combination as selected when it is determined by the second determining means that other actuators than the travel motors are in operation is selected.

The control means will be described in detail by referring to a flow chart shown in FIG. 16. In the control means shown in FIG. 16, to determine that the excavator is in the travelling condition in step S2 to select one of the three combinations of A, C and D shown in FIG. 7 in accordance with the H-mode, L-mode, P-mode or E-mode in step S3, and to determine that the excavator is not in the travelling condition in step S2 and that other actuators than the travel motors are in operation in step S4 to select one of the two combinations of B and C shown in FIG. 7 in accordance with the P-mode or E-mode in step S5, are the same as the embodiment shown in FIG. 14.

In step S4, when other actuators than the travel motors are determined not to be in operation, that is, when it is determined that the excavator is not in the travelling condition and other actuators are not in operation in step S4, the operation moves to step S6 in which the period of time during which this condition is sustained is measured by the timer of the processing section 35b, and the second determining means of the processing section 35b determines whether or not the time measured by the timer has elapsed 2.5 seconds. When the determination made in step S6 is satisfied, that is, the excavator is not travelling at fine speed and other actuators than the travel motors are not performing fine operations, the operation moves to step S5 in which the P-mode or E-mode, which is an operation mode other than the travelling mode, is automatically selected in accordance with the signal outputted by the mode switch 32 selected previously, and position B or C corresponding to the P-mode or E-mode is selected, thereby providing a maximum discharge flow rate $Q_P = N1 \times q2$ or a maximum discharge flow rate $Q_E = N2 \times q1$. When the determination made in step S6 is not satisfied, for example, when fine operation is being performed, the operation returns to the beginning.

In the embodiment of the aforesaid construction, when the condition in which the excavator is not travelling and other actuators than the travel motors are not in operation lasts for more than 2.5 seconds, the P-mode or E-mode suitable for digging operations is selected in preparation for performing digging operations which have a relatively higher incidence than travelling. Thus it is possible to select a combination of the maximum revolution number and the maximum displacement volume corresponding to position B or C corresponding to the P-mode or E-mode. From a change in the revolution number of the prime mover which takes place at this time and manifests itself as a change in the sound produced by the prime mover, the operator can readily find out the present mode. No change in the combination of the maximum revolution number and the maximum displacement volume occurs when an operation for heavy digging or light digging commences.

When the condition in which the excavator is not travelling and other actuators than the travel motors are not in operation does not last for more than 2.5 seconds, a combination of the maximum revolution number and the maximum displacement volume corresponding to the position selected previously remains valid, so that fine operations can be performed.

Figure 16:
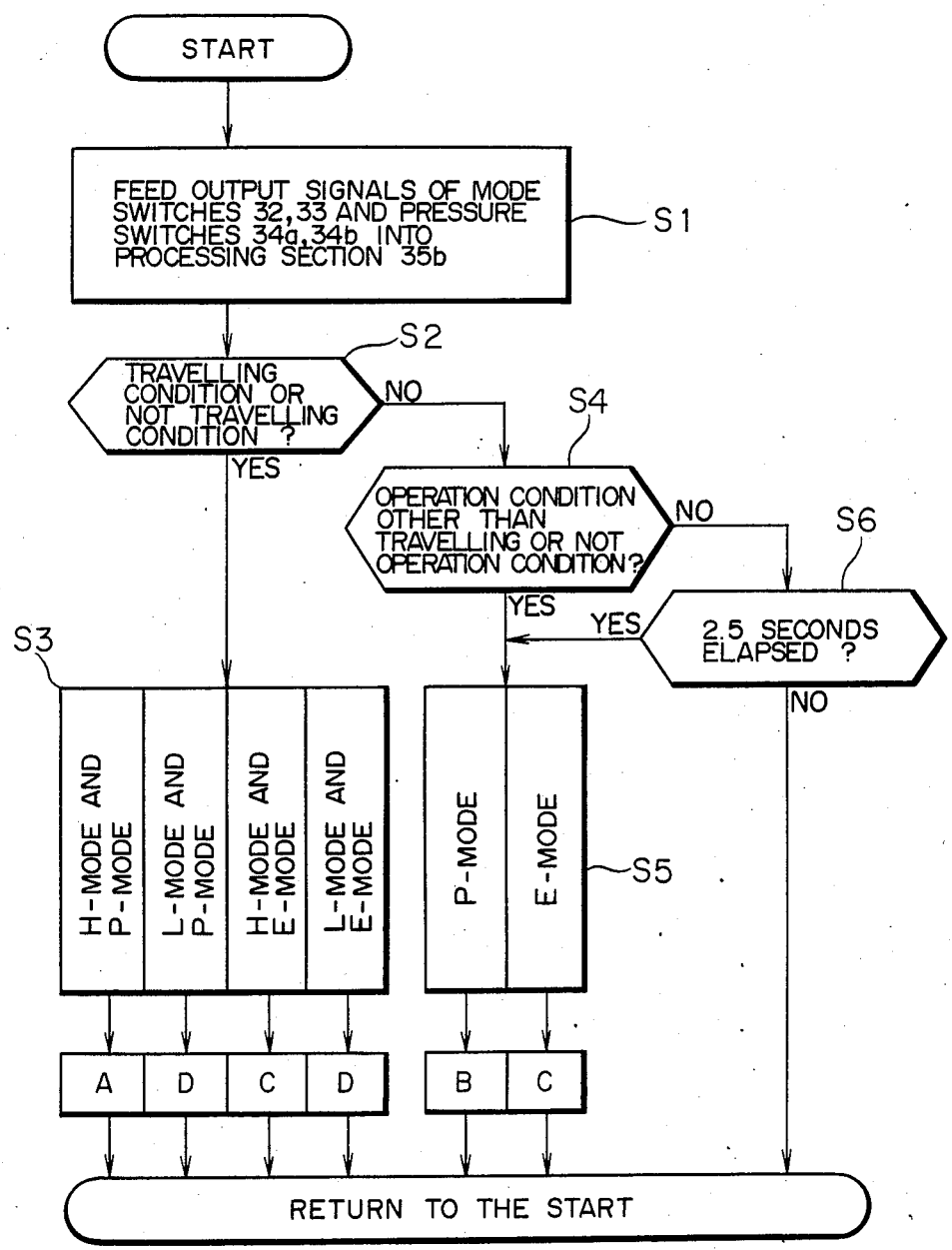
FIG. 16 is a flow chart in explanation of the operation of the control system comprising still another embodiment of the invention.

That is, when the excavator is not travelling and other actuators than the travel motors are not in operation, the embodiment of the control system shown in FIG. 16 enables a combination of the maximum revolution number of the prime mover and the maximum displacement volume of the hydraulic pumps suitable for other operations of higher incidence than travelling to be automatically selected, after lapse of a period of time having no influences on fine operations. At this time, operator becomes aware of a change in mode by listening to the sound produced by the prime mover, thereby obtaining good feeling in operation. No change occurs in the combination of the maximum revolution number and the maximum displacement volume when the operation commences, so that the operator is free from the strange feeling which he might otherwise have when such change occurs. This enables the operation to be performed smoothly.

While a fine operation is being performed, no change occurs in the combination of the maximum revolution number and the maximum displacement volume, so that fine operations can be performed satisfactorily.

Figure 17:
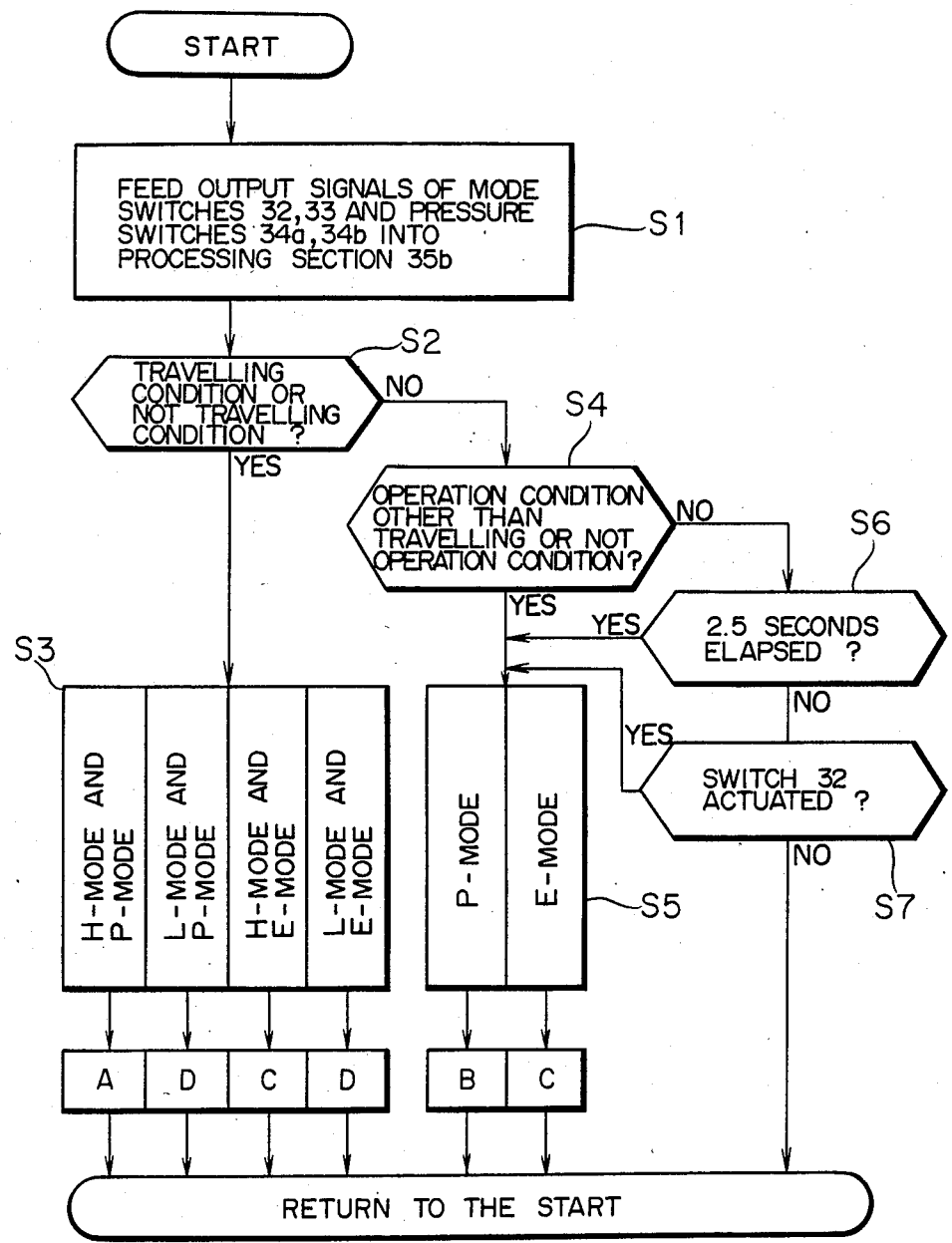
FIG. 17 is a flow chart in explanation of the operation of the control system comprising still another embodiment of the invention.

FIG. 17 is a flow chart for still another embodiment of the control system according to the invention. In this embodiment, the processing section 35b of the controller 35 comprises a third determining means for determining whether or not a signal outputted by the mode switch 32 has undergone a change, when the determination made by the second determining means is not satisfied, that is, the determination whether or not the condition in which the excavator is not travelling and other actuators are not in operation has lasted for more than 2.5 seconds. Thus, when it is determined in step S7 by the third determining means that the mode switch 32 has been actuated, the operation moves to step S5 in which position B or C corresponding to the P-mode or E-mode selected by the mode switch 32 is selected. When the determination made in step S7 is not satisfied, the operation returns to the beginning. In the embodiment shown in FIG. 17, the control system, besides achieving the same results as achieved by the embodiments described previously, enables a combination of the maximum revolution number and the maximum displacement volume suitable for digging or other operations intended by the operator to be selected, even if the condition in which the excavator is not travelling and other actuators than the travel motors are not in operation lasts for less than 2.5 seconds.

Figure 18:
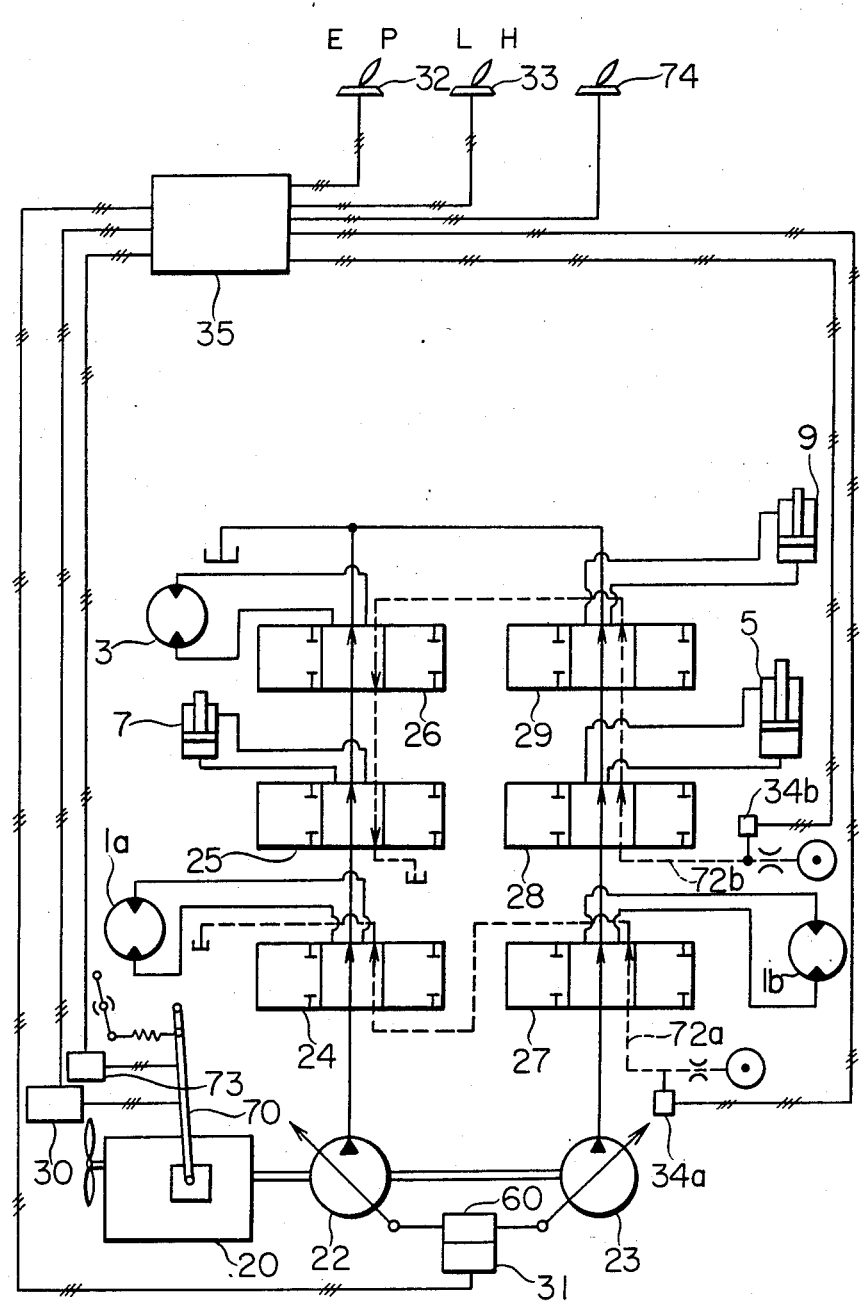
FIG. 18 is a circuit diagram of the control system comprising still another embodiment of the invention.
Figure 19:
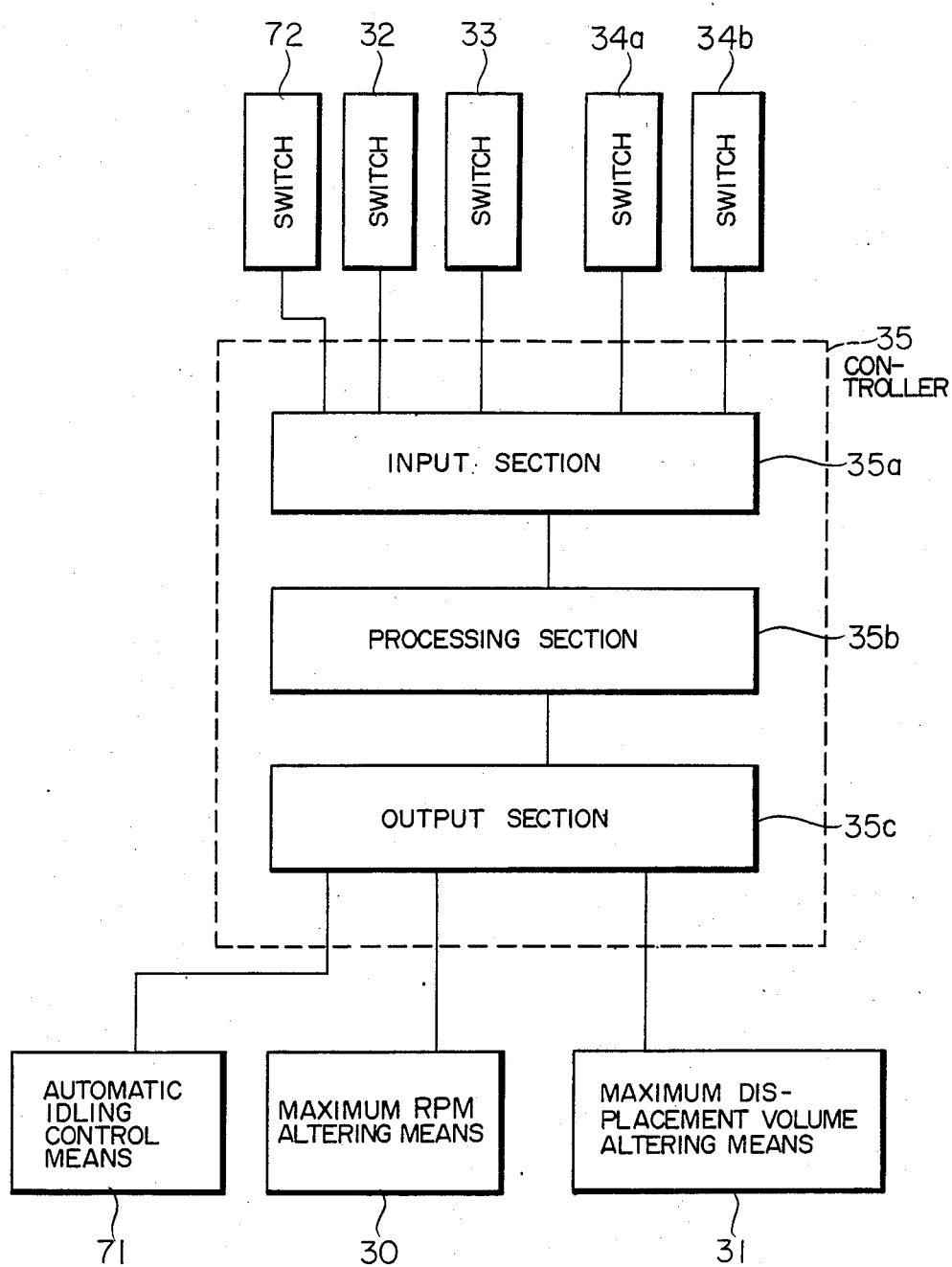
FIG. 19 is a block diagram of the controller shown in FIG. 18, showing its construction.

A still another embodiment of the invention will be described by referring to FIGS. 18-21. In FIG. 18, the control system further comprises, in addition to the parts described by referring to the first embodiment shown in FIG. 2, automatic idling control means 73 for controlling the governor lever 70 in such a manner that the revolution number of the engine 20 becomes a low idling revolution number that does not interfere with the following operation, and a third selection means, namely, an automatic idling switch 74 for selecting an idling mode. Both the automatic idling control means 73 and automatic idling switch 74 are connected to the controller 35. As shown in FIG. 19, the automatic idling switch 74 is connected to the input section 35a of the controller 35 and the automatic idling control means 73 is connected to the output section 35c thereof.

Figure 20:
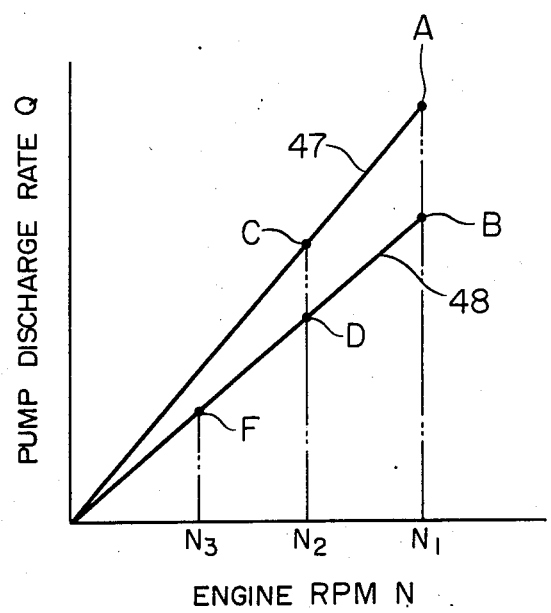
FIG. 20 is a diagrammatic representation of the combination of maximum revolution number of the engine and maximum displacement volume of the hydraulic pump set in the processing unit of the controller shown in FIG. 18.

FIG. 20 is a diagram similar to the diagram shown in FIG. 7 showing a plurality of combinations of maximum revolution number of the engine 20 set in the processing section 35b of the controller 35 and maximum displacement volume of the variable displacement hydraulic pumps 22 and 23. In FIG. 20, positions A, B, C and D have the same contents as the corresponding positions shown in FIG. 7. Position F is located on the characteristic line 48 on an idling revolution number N3 smaller than the second maximum revolution number N2. That is, position F indicates a combination of the idling revolution number N3 and the second maximum tilting angle q2 of the swash plate of the hydraulic pumps.

In this embodiment, the processing section 35b of the controller 35 constitutes control means distinct from that of the first embodiment shown in FIG. 5. More specifically, the control means of the processing section 35b shown in FIG. 19 comprises, in addition to the parts shown in FIG. 14, means for providing a combination F of the idling revolution number N3 and the second maximum tilting angle q2 in association with the operation conditions of the travel motors and other actuators. The control means further comprises a third determining means for determining whether or not the automatic idling mode has been selected by the automatic idling switch 74 after it has been determined by the second determining means that other actuators 3, 5, 7 and 9 are not in operation. When it is determined by the third determining means that the automatic idling mode has been selected, the combination F is selected. When it is determined by the third determining means that the automatic idling mode is not selected, the same combination as selected when other actuators have been determined to be in operation by the second determining means is selected.

The control means of this embodiment will be described in detail by referring to the flow chart shown in FIG. 21. To determine that the excavator is in the travelling condition in step S2 and then to select one of the three combinations of A, C and D shown in FIG. 7 in accordance with the H-mode, L mode, P-mode or E-mode selected in step S3, and to determine that the excavator is not in the travelling condition in step S2 and that other actuators than the travel motors are in operation in step S4 and then to select one of the two combinations of B and C shown in FIG. 7 in accordance with the P-mode or E-mode selected in step S4, are the same as the embodiment shown in FIG. 14.

Figure 21:
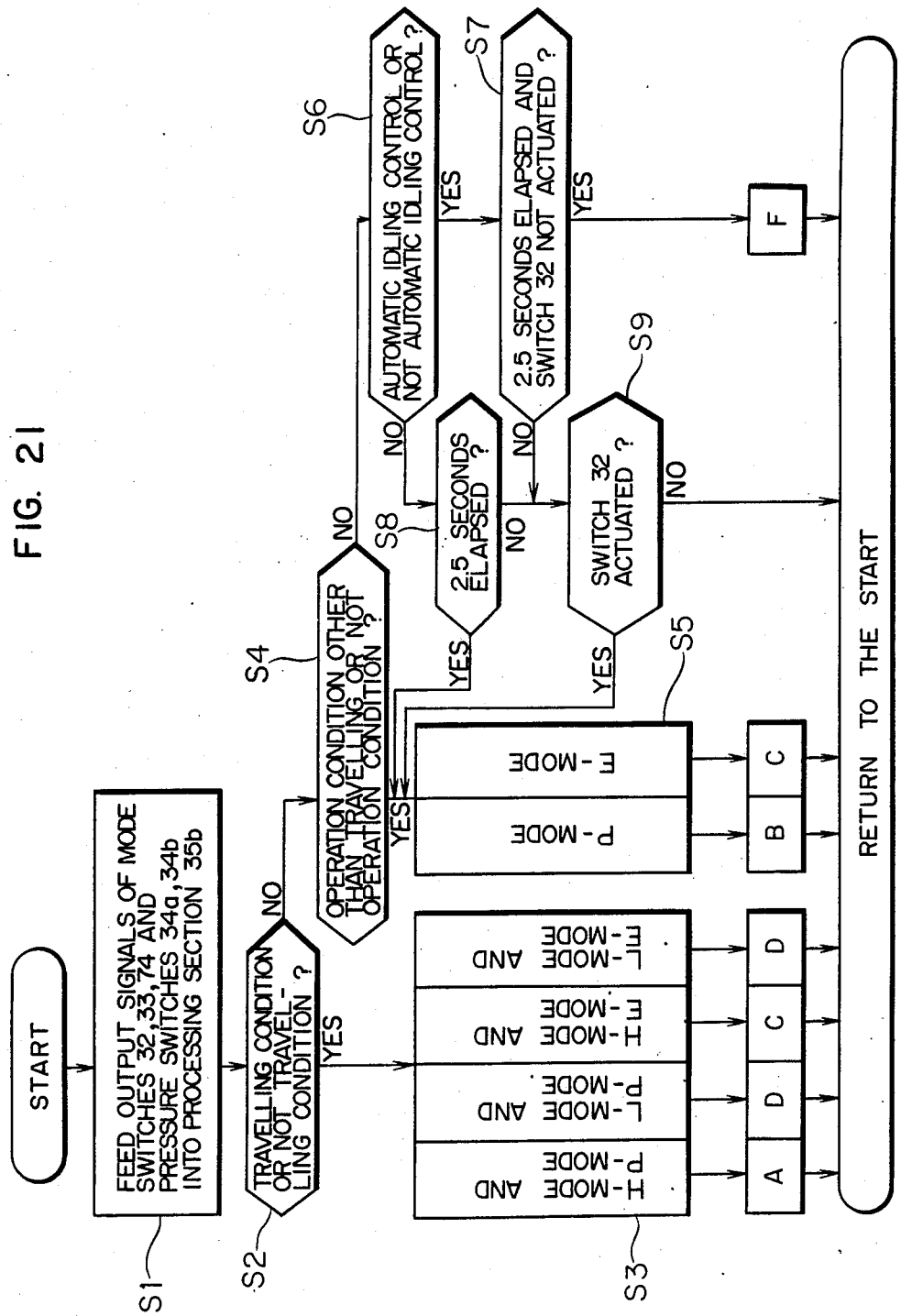
FIG. 21 is a flow chart in explanation of the operation of the controller shown in FIG. 18.

In FIG. 21, when other actuators than the travel motors are determined not to be in operation, that is, when it is determined in step S4 that the excavator is not in the travelling condition and other actuators than the travel motors are not in operation, the operation moves to step S6 in which it is determined by the third determining means of the processing section 35b of the controller 35 whether or not automatic idling control is, that is, automatic idling control has been selected by the switch 74. When the determination made by the third determining means is satisfied and a signal has been supplied from the switch 74 to the processing section 35b of the controller 35 through the input section 35a, the operation moves to step S7. In step S7, the period of time that has elapsed since the determination was made in step S6 is measured by the first timer of the processing section 35b and two determinations are made by the fourth determining means of the processing section 35b, one of the two determinations concerning whether the period of time measured by the first time is more than 2.5 seconds and the other determination being whether the signal outputted by the switch 32 has been altered. When these two determinations are satisfied, position F shown in FIG. 20 that has been set beforehand in association with automatic idling control is selected and a signal is supplied to the output section 35c of the controller 35 to select the idling revolution number N3 of the engine 20 and the second maximum tilting angle q2 of the swash plate of the hydraulic pumps 22 and 23. The output section 35c in turn supplies a signal to the automatic idling control means 73 and at the same time supplies a signal corresponding to the second maximum tilting angle q2 to the electromagnetic control valve 31c shown in FIG. 4. As a result, the governor lever 70 is actuated and the revolution number of the engine 20 becomes an idling revolution number N3 and at the same time the electromagnetic control valve 31c is kept in the position shown in FIG. 4, so that the pressurized fluid in the hydraulic cylinder 30d is supplied to the hydraulic cylinder 31b and the piston 31a is unmovably kept in a left side position. Thus the movement of the piston 60a is restricted by the piston 31a, to thereby provide the smaller tilting angle q2. At this time, the maximum discharge flow rate $Q_F$ is $Q_F=N3\times q2$ which is sufficiently low.

When the determination made in step S6 shown in FIG. 21 is not satisfied, the operation moves to step S8. In step S8 the period of time that has elapsed after the determination was made in step S6 is measured by the second timer of the processing section 35b, and it is determined by a fifth determining means of the processing section 35b whether the time measured by the second time is more than 2.5 seconds. When the determination made in step S8 is satisfied, that is, when no fine travelling or no fine operation is taking place, the operation moves to step S5. In step S5, either the P-mode or E-mode which is a mcde of operation other than the travelling mode is automatically selected in accordance with the signal selected previously that has been supplied by the mode switch 32, so that position B or C corresponding to the P-mode or E-mode is selected. Thus the maximum discharge flow rate $Q_P=N1\times q2$ or $Q_E=N2\times q1$ referred to hereinabove is provided corresponding to position B or C. When the determination made in step S8 is not satisfied and a determination made in step S7 is not satisfied either, the operation moves to step S9. In step S9, it is determined by a sixth determining means of the processing section 35b whether the signal outputted by the mode switch 32 has been altered. When the determination made by the sixth determining means is satisfied, the operation moves to step S5 in which position B or C is selected in accordance with the operation mode P-mode or E-mode that has been selected by the switch 32.

When the determination made in step S9 is not satisfied and when the determination made in step S7 is satisfied, processing has been effected as predetermined, thereafter the operation returns to the beginning.

The embodiment of the aforesaid construction offers the advantage that when a signal indicating automatic idling control is outputted while the excavator is not in the travelling condition and other actuators than the travel motors are not in operation, it is possible to switch the engine 20 immediately to automatic idling after the period of time measured by the timer has exceeded 2.5 seconds, so long as the mode switch 32 has not changed its position.

When no signal indicating automatic idling control is outputted by the switch 74 while the excavator is not in the travelling condition and other actuators than the travel motors are not in operation, the P-mode or E-mode suitable for digging operations is selected in preparation for digging or other operations having a relatively high incidence than travelling, after the condition referred to hereinabove has lasted for more than 2.5 seconds. Thus a combination of the maximum revolution number and the maximum displacement volume of position B or C corresponding to the P-mode or E-mode that can be selected. The operator is able to learn, from a change in the revolution number of the prime mover or a change in the sound produced by the prime móver as it rotates, what is the mode the excavator is now in. The combination of the maximum revolution number and the maximum displacement volume undergoes no change when heavy digging operations or light digging operations are performed.

When automatic idling control is not selected while the excavator is not in the travelling condition and other actuators than the travel motors are not in operation, the combination of the maximum revolution number and the maximum displacement volume of the previously selected position is valid in the event that the aforesaid condition lasts for less than 2.5 seconds. Thus fine operations can be performed smoothly.

When the mode switch 32 has changed its position, it is possible to provide a combination of the maximum revolution number of the prime mover and the maximum displacement volume of the hydraulic pumps suitable for a digging operation intended by the operator regardless of whether or not automatic idling control is selected, even when the condition in whicn the excavator is not travelling and other actuators than the travel motors are not in operation has lasted for a period of less than 2.5 seconds.

Figure 22:
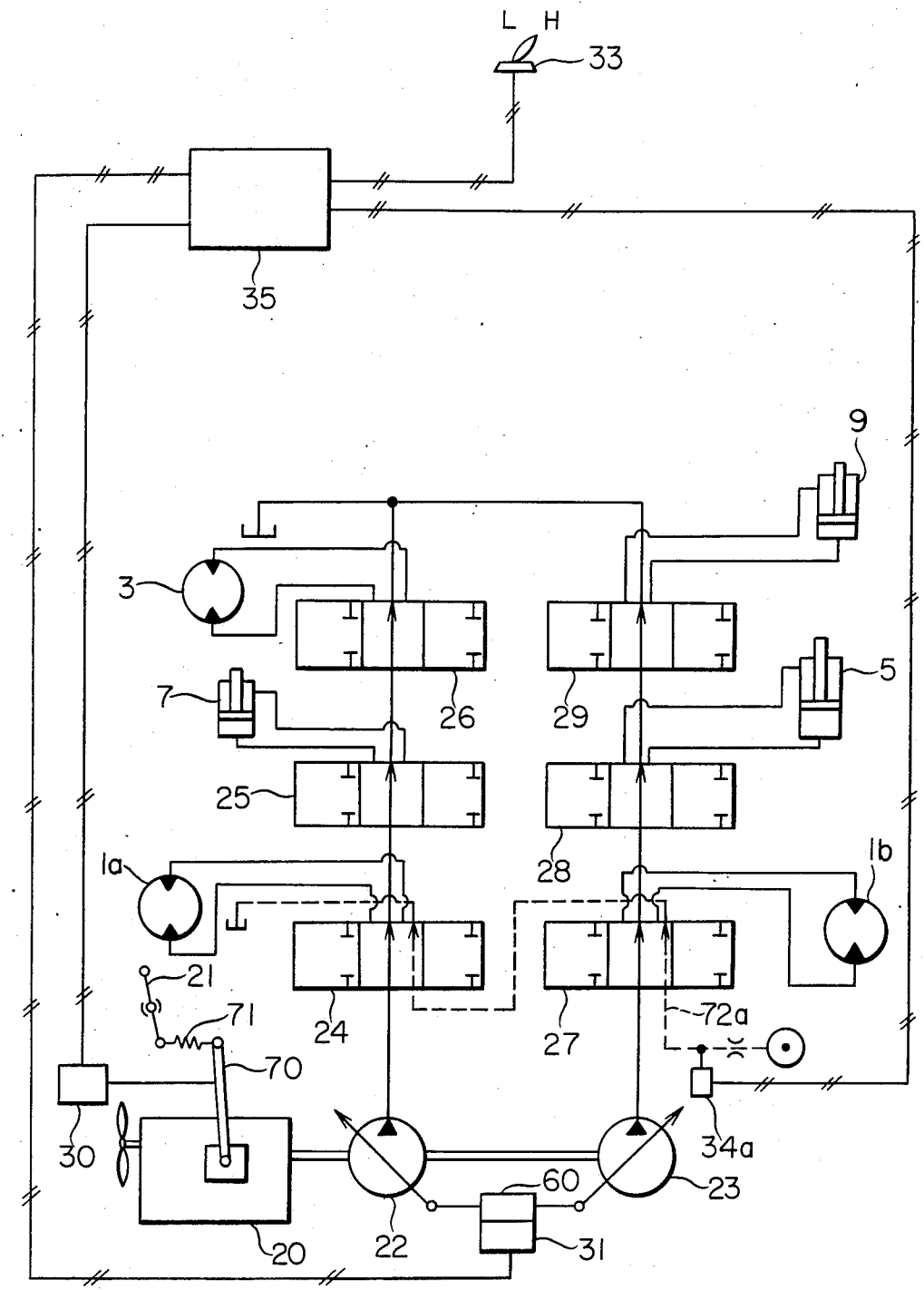
FIG. 22 is a circuit diagram of the control system comprising still another embodiment of the invention.

Still another embodiment of the invention will be described by referring to FIGS. 22–24. As shown in FIG. 22, this embodiment does not have the mode switch for selecting the P-mode or E-mode and the pressure switch for sensing whether or not other actuators 3, 5, 7 and 9 than the travel motors 1a and 1b are in operation, which are shown in FIG. 2 as parts of the first embodiment. Thus, as shown in FIG. 23, only the mode switch 33 for selecting the high-speed travelling mode or the low-speed travelling mode and the pressure switch 34a for sensing whether or not the travel motors 1a and 1b are in operation are connected to the ihput section 35a of the controller 35.

Figure 24:
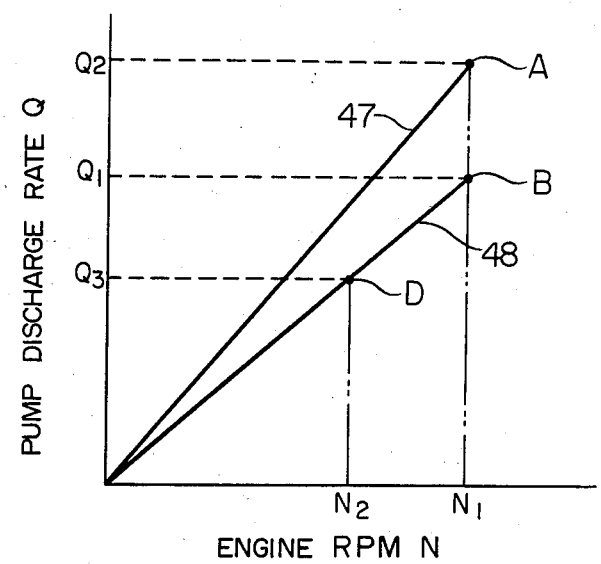
FIG. 24 is a diagrammatic representation of the combination of maximum revolution number of the engine and maximum displacement volume of the hydraulic pump set in the processing section of the controller shown in FIG. 12.

FIG. 24 is a diagram similar to that shown in FIG. 7 which shows combinations of the maximum revolution numbers of the engine and the maximum displacement volumes of the variable displacement hydraulic pumps or the maximum tilting angle of the swash plate that are set in the processing section 35b of the controller 35. In FIG. 24, positions A, B and D have the same contents as those shown in FIG. 7. Position C shown in FIG. 7 is not shown in FIG. 24 because this position is not required in this embodiment.

Figure 23:
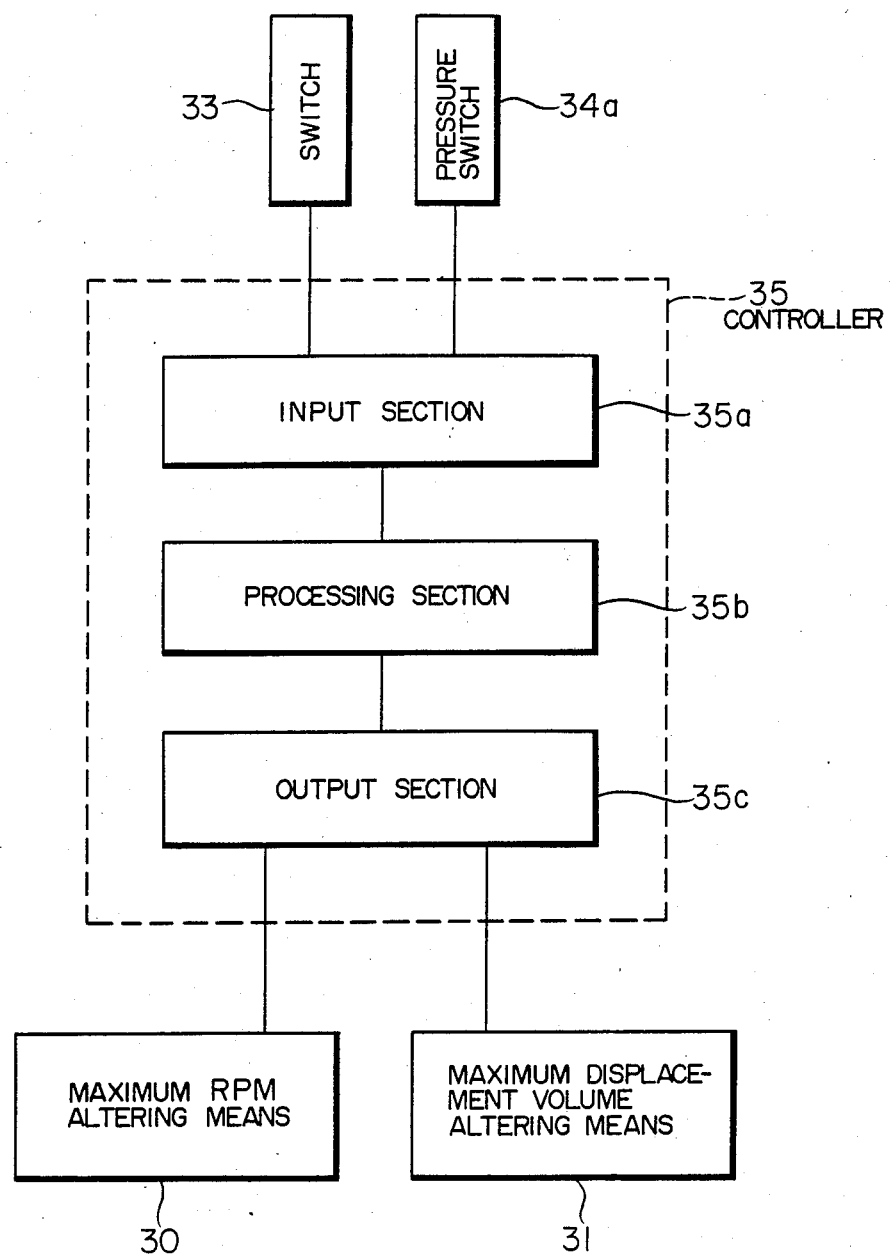
FIG. 23 is a block diagram of the controller shown in FIG. 22, showing its construction.

The processing section 35b of the controller 35 shown in FIG. 23 constitutes control means which is distinct from the control means of the processing section 35b of the first embodiment shown in FIG. 5. More specifically, the control means constituted by the processing section 35b of this embodiment sets beforehand a plurality of combinations A, B and D of the maximum revolution numbers N1 and N2 and the maximum displacement volumes q1 and q2 in association with the operating condition of the travel motors and the selection of the travelling mode. The control means operates as follows. When only the travel motors 1a and 1b are in operation and the high-speed travelling mode is selected based on the output signals of the pressure switch 34a and mode switch 33, the content of position A is selected. When only the travel motors 1a and 1b are in operation and the low-speed travelling mode is selected, the content of position D is selected. When other actuators than the travel motors 1a and 1b are in operation, the content of position B is selected.

In the embodiment of the aforesaid construction, when the control lever for travelling is actuated while the H-mode is selected by the mode switch 33, the directional control valves 24 and 27 are actuated to raise the pilot pressure and turn on the pressure switch 34a. As a result, signals are supplied from the mode switch 33 and pressure switch 34a to the processing section 35b via the input section 35a. The processing section 35b supplies to the output section 35c signals indicating the first maximum revolution number N1 of the engine 20 and the first maximum tilting angle q1 of the swash plate of the hydraulic pumps 22 and 23 corresponding to position A, and the output section 35c supplies a signal indicating the first maximum revolution number N1 to the electromagnetic control valve 30g shown in FIG. 3 which constitutes the maximum revolution number altering means 30 and a signal indicating the first maximum tilting angle q1 to the electromagnetic control valve 31c shown in FIG. 4 which constitutes the maximum displacement volume altering means 31.

Thus the embodiment provides the discharge pressure P-pump discharge flow rate Q characteristic represented by the characteristic line 51 shown in FIG. 11. At this time, the maximum discharge flow rate $Q_H$ is large and becomes $Q_H = N1 \times q1$ which enables high-speed travelling to be realized.

When the control lever for travelling is actuated while the L-mode is selected by the mode switch 33, the pressure switch 34a is actuated as described hereinabove in conjunction with the actuation of the directional control valves 24 and 27, so that the processing section 35b of the controller 35 selects position D and the output section 35c supplies a signal indicating the second maximum revolution number N2 to the electromagnetic control valve 30g shown in FIG. 3 and a signal indicating the second maximum tilting angle q2 to the electromagnetic control valve 31c shown in FIG. 4.

Thus the embodiment provides the P-Q characteristic represented by the characteristic line 52 in FIG. 11. At this time, the maximum discharge flow rate $Q_L = N2 \times q2$ which is sufficiently lower than the discharge flow rate $Q_H$ referred to hereinabove. Thus fine speed travelling can be realized with ease.

When no signal is outputted by the pressure switch 34a, position B is selected by the processing section 35b of the controller 35. Since position B indicates the combination of the first maximum revolution number N1 and the second maximum tilting angle q2, the electromagnetic control valve 30g is kept in the position shown in FIG. 3 and the electromagnetic control valve 31c is kept in the position shown in FIG. 4. Thus the P-Q characteristic represented by the characteristic line 49 shown in FIG. 10 is provided. At this time, the maximum discharge flow rate $Q_P = N1 \times q2$ which is intermediate between the higher maximum discharge flow rate $Q_H$ and the lower maximum discharge flow rate $Q_L$. With the discharge flow rate not being too high, it is possible to perform fine operations with other actuators than the travel motors 1a and 1b relatively easily.

Figure 25:
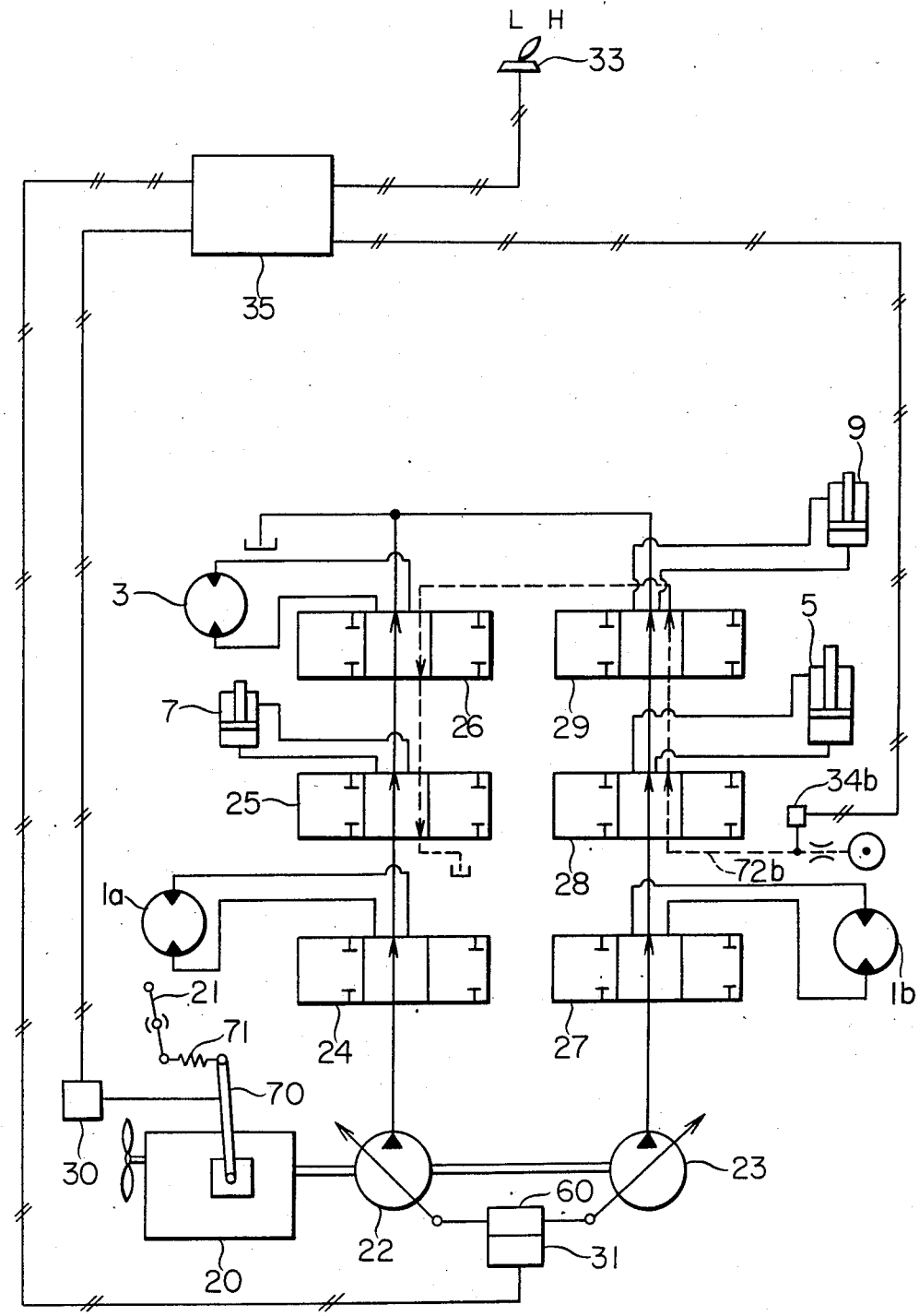
FIG. 25 is a circuit diagram of the control system comprising still another embodiment of the invention.

FIG. 25 is a circuit diagram of still another embodiment of the invention. In this embodiment, the pressure switch 34a of the embodiment shown in FIG. 22 is replaced by the pressure switch 34b which responds to the actuation of the directional control valves 25, 26, 28 and 29. When the mode switch 33 indicates the H-mode for high-speed travelling while the pressure switch 34b remains inoperative, position A shown in FIG. 24 is selected. When the mode switch 33 indicates the L-mode for low-speed travelling while the pressure switch 34b remains inoperative, position D is selected. When the pressure switch 34b is operative in these cases, position B is selected.

The embodiment of the invention constructed as aforesaid provides, like the embodiments described previously, the following discharge flow rates. When the excavator travels at high speed, the higher discharge flow rate $Q_H = N1 \times q1$ is provided. When it travels at low speed, the discharge flow rate $Q_L = N2 \times q2$ which is sufficiently lower than the discharge flow rate $Q_H$ is provided. When the front attachments are driven, the discharge flow rate $Q_P$ which is intermediate between the discharge flow rates $Q_H$ and $Q_L$ is provided. Thus high-speed travelling can be readily realized and fine operations of the front attachments can be positively performed.

The embodiment of the invention as incorporated in a hydraulic excavator of the wheel type will be described by referring to FIGS. 26–32.

Figure 26:
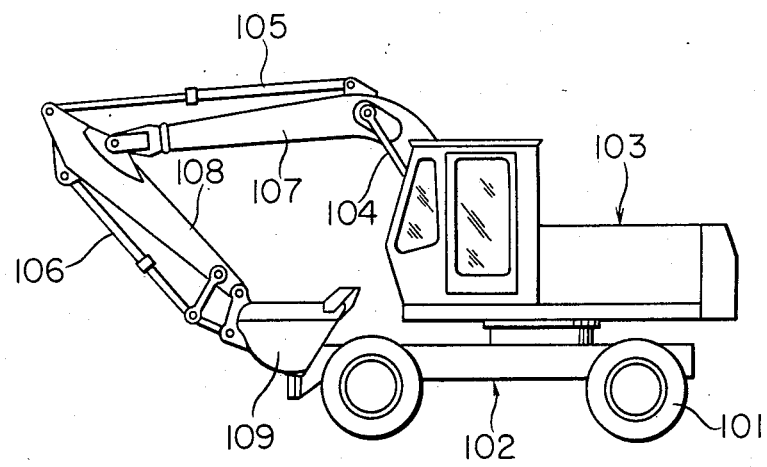
FIG. 26 is a side view of a hydraulic excavator of the wheel type in which the control system according to the invention can be incorporated.

Referring to FIG. 26, the hydraulic excavator of the wheel type comprises an underframe 102 provided with a plurality of wheels 101 with pneumatic tires, and a swing 103 supported on the underframe 102 by means of a swing ring. The swing 103 is equipped with front attachments, such as a boom 107, an arm 108 and a bucket 109 which are driven by hydraulic cylinders 104, 105 and 106, respectively.

Figure 27:
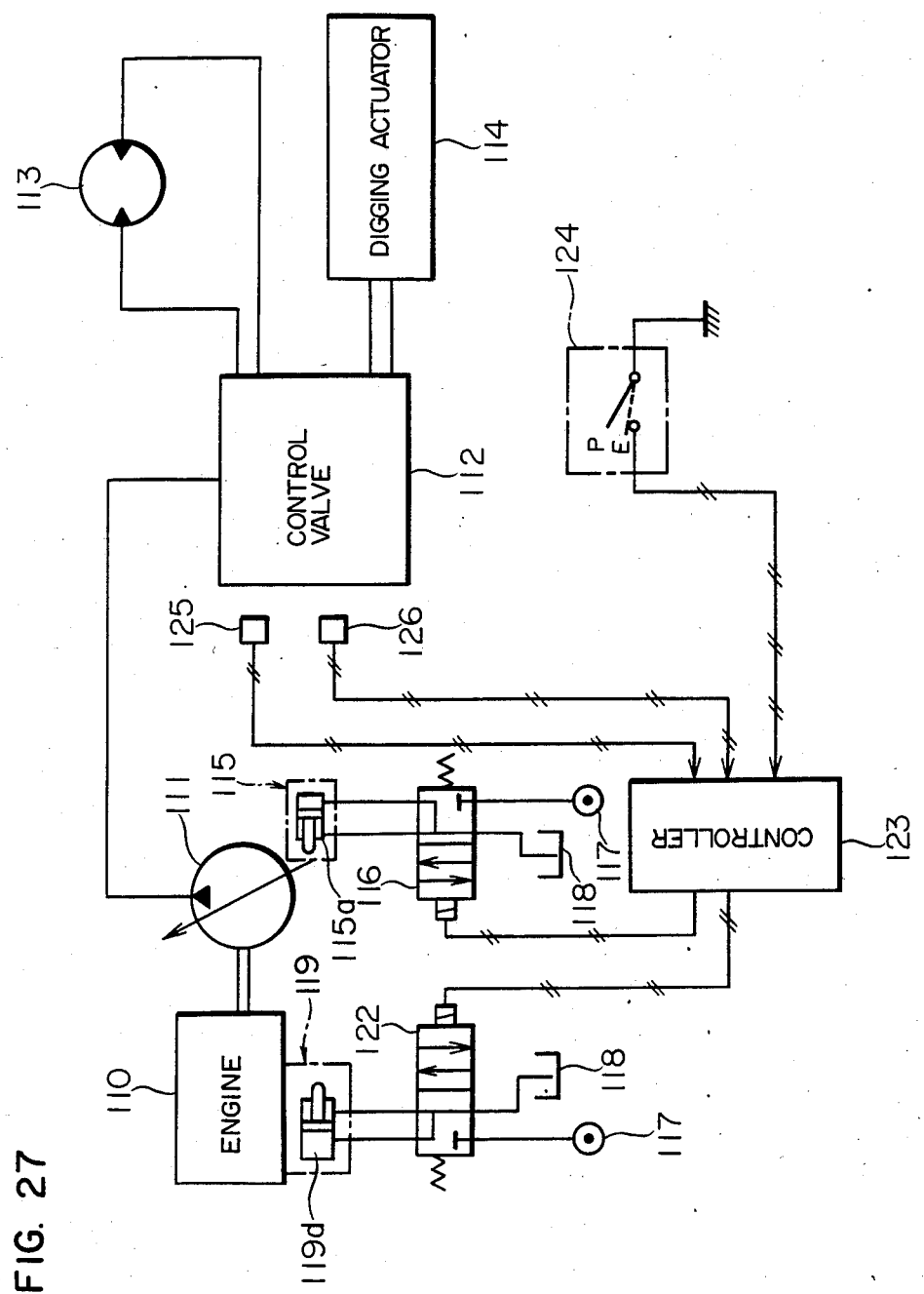
FIG. 27 is a circuit diagram of the control system comprising still another embodiment of the invention as incorporated in the hydraulic excavator of the wheel type shown in FIG. 16.
Figure 28:
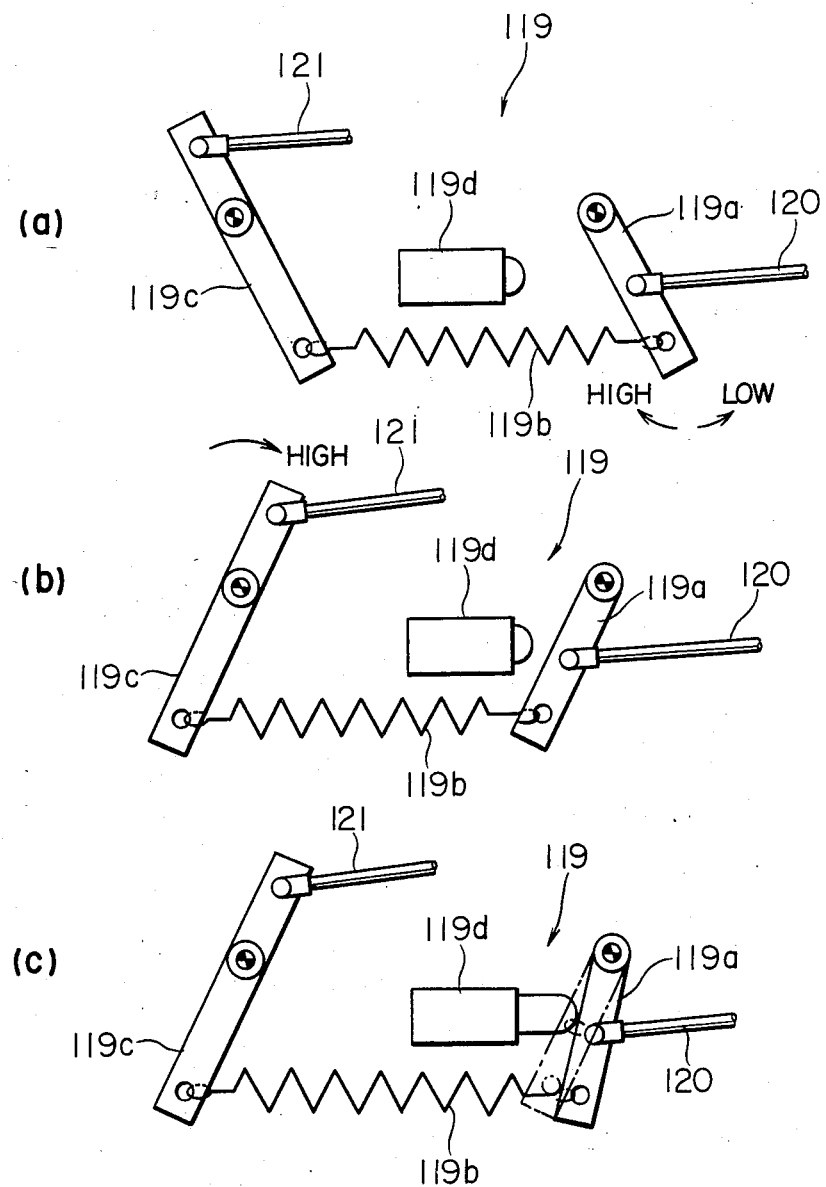
FIGS. 28(a), 28(b) and 28(c) are schematic views in explanation of the construction and operation of the maximum revolution number altering means shown in FIG. 27.

The hydraulic excavator of the wheel type of the aforesaid construction has incorporated therein the control system according to the invention. FIG. 27 shows the control system with a hydraulic circuit, in which the reference numeral 110 designates a prime mover or engine to which is connected a variable displacement hydraulic pump 111 driven by the engine 110. The hydraulic pump 111 has a discharge port which is connected via a control valve 112 to a travel motor 113 for driving the wheels 101, and actuators 114 for digging operations including the hydraulic cylinders 104–106 mounted on the swing 103 and a swing motor, not shown, for driving the swing ring.

Figure 30:
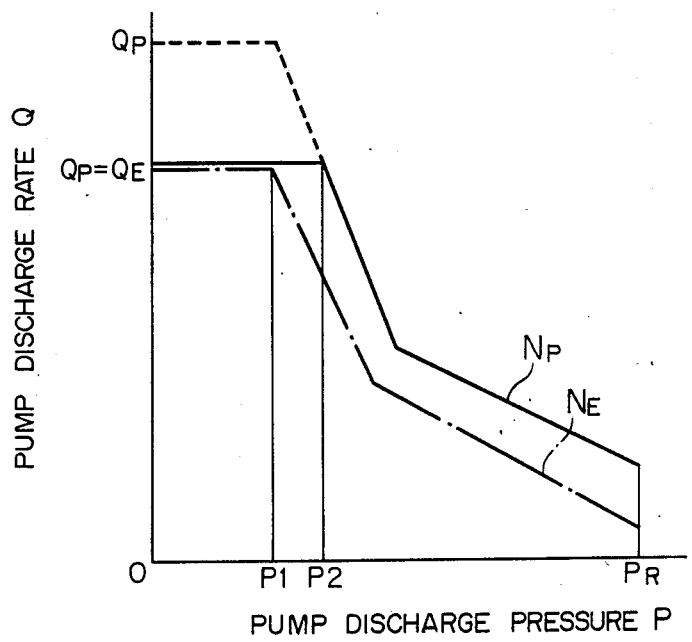
FIG. 30 is a diagrammatic representation of the relation between the discharge pressure (P) and the discharge rate (Q) of the hydraulic pump established in a power-mode operation and an economy-mode operation performed by the embodiment shown in FIG. 27.

The variable displacement hydraulic pump 111 is equipped with a regulator, not shown, for controlling the displacement volume by a circuit pressure (for example, to provide a characteristic line P-Q shown in FIG. 30). The pump 111 is equipped with maximum displacement volume altering means 115 associated with the regulator and including a maximum tilting angle setting cylinder 115a for controlling a maximum value of displacement volume for one revolution of the pump in two stages. The hydraulic cylinder 115a is connected via an electromagnetic valve 116 to a pressure source 117 and a reservoir 118.

The engine 110 is provided with maximum revolution number altering means 119 associated with a governor, not shown, for altering the maximum revolution number of the engine 110. Referring to FIGS. 28(a)–28(c), the maximum revolution number altering means 119 comprises a lever 119a pivotally supported at a predetermined location and connected to a throttle lever 120 which in turn is connected to the governor. A spring 119b is mounted at one end on a forward end of the lever 119a and at an opposite end on one end portion of a lever 119c pivotally supported at a predetermined location. An opposite end of the lever 119c is connected to an engine control lever, not shown, in the operator's cab through a push-pull cable 121, for example. The maximum revolution number altering means 119 further comprises a hydraulic cylinder 119d for controlling the pivoting angle of the lever 119a whose maximum pivoting angle is restricted by the hydraulic cylinder 119d as shown in FIG. 28(c), thereby altering the maximum revolution number of the engine 110. The hydraulic cylinder 119d is connected via an electromagnetic valve 122 to the pressure source 117 and reservoir 118. FIGS. 28(a) and 28(b) show the engine 110 in an idling condition and a full throttle condition, respectively.

Referring to FIG. 27 again, the reference numeral 123 designates a controller which may be a microcomputer, for example. A mode control switch 124 constituting selection means, a travel sensor 125 and a digging sensor 126 are connected to an input port of the controller 123. The mode control switch 124 is the switch selectable either the power mode (P) or the economy mode (E) and may be in the form of a toggle switch, for example. The travel sensor 125 senses whether or not a travel lever, not shown, mounted on the swing 103 is actuated, and may be in the form of an ON-OFF switch linked to the travel lever, for example. The digging sensor 126 senses whether or not a digging lever, not shown, mounted on the swing 103 is actuated, and may be in the form of an ON-OFF switch linked to the digging lever. The digging lever in this specification refers to each of levers for operating the boom 107, arm 108 and bucket 109 and a swing operation lever.

When the travel and digging are operated by what is generally referred to as a hydraulic pilot pressure system, the sensors 125 and 126 may be in the form of pressure switches responsive to operation pilot pressures.

An electromagnetic valve 116 connected to the maximum tilting angle setting hydraulic cylinder 115a, and another electromagnetic valve 122 connected to the engine revolution number control hydraulic cylinder 119d are connected to an output port of the controller 123. The electromagnetic valves 116 and 122 respond to the positions of the mode control switch 124 and, when the mode control switch 124 is in the power-mode position, the electromagnetic valve 116 is energized, and the electromagnetic valve 122 is de-energized and when the switch 124 is in the economy-mode position, the electromagnetic valve 122 is energized and the electromagnetic valve 116 is de-energized.

Operation of the embodiment of the aforesaid construction will now be described.

(1) Power-Mode Operation

As the power-mode control switch 124 is switched to a power-mode position, the electromagnetic valve 116 is energized and the maximum tilting angle setting hydraulic cylinder 115a is communicated with the pressure source 117, so that the maximum tilting angle altering means 115 shown in the figure operates to set the maximum tilting angle at a value corresponding to a displacement volume $q_p$. At this time, the maximum revolution number altering electromagnetic valve 122 is de-energized, so that the hydraulic cylinder 119d is not driven. Thus, if the engine control lever in the operator's cab is fully pulled, it is possible to rotate the engine up to a maximum revolution number Nr because the pivoting movement of the lever 119a is not restricted as shown in FIG. 28(b).

Figure 29:
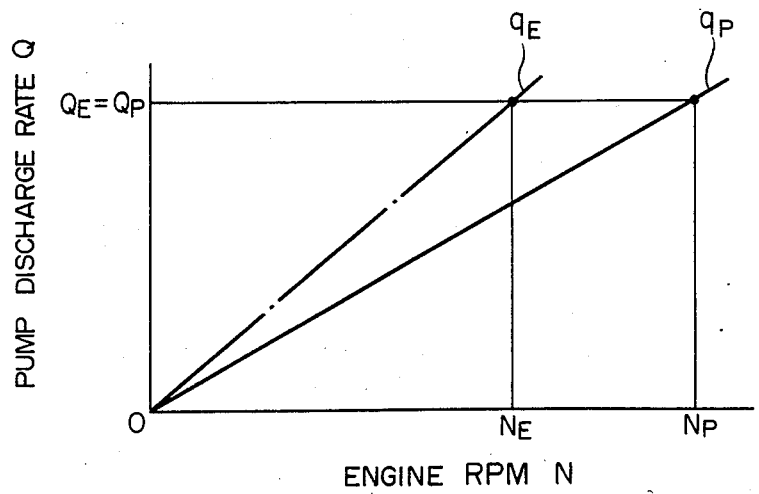
FIG. 29 is a diagrammatic representation of the combination of maximum revolution number of the engine and maximum displacement volumes of the hydraulic pump set in the controller shown in FIG. 27.

Thus, so long as the tilting angle of the swash plate of the hydraulic pump 111 has a maximum value and the displacement volume is $q_p$ in a low pressure range (less than a pressure P2 shown in FIG. 30), the discharge flow rate of the pump 111 increases in proportion to an increase in the revolution number of the engine 110 as shown by a solid line in FIG. 29, thereby providing a maximum discharge flow rate $Q_P$ at the maximum revolution number $N_P$ of the engine 110. In this case, the P-Q characteristic of the pump 111 at the engine revolution number $N_P$ is as indicated by a solid line in FIG. 30.

(2) Economy-Mode Operation

As the mode control switch 124 is switched to an economy-mode position, the maximum tilting angle setting electromagnetic valve 116 is de-energized and the maximum tilting angle setting hydraulic cylinder 115a is communicated with the reservoir 118, so that the maximum tilting angle altering means 115 shown in the figure operates to set the maximum tilting angle at a value corresponding to a displacement volume $q_E$ ($>q_P$). At this time, the engine revolution number limiting electromagnetic valve 122 is energized, so that the hydraulic cylinder 119d is driven. Thus, if the engine control lever in the operator's cab is fully pulled, the tilting movement of the lever 119a is limited by the cylinder as shown in FIG. 28(c) and the maximum revolution number of the engine is limited to $N_E$ ($<N_P$).

Thus, so long as the tilting angle of the hydraulic pump 111 is maximized and the displacement volume is $Q_E$ in a low pressure range, the discharge flow rate of the pump 111 increases in proportion to an increase in engine revolution number as shown by a dash-and-dot line in FIG. 29 and a maximum discharge flow rate $Q_E$ ($=Q_P$) is obtained at a maximum revolution number $N_E$ of the engine 110. In this case, the P-Q characteristic of the pump 111 at the engine revolution number $N_E$ is as indicated by a dash-and-dot line in FIG. 30.

A broken-line curve shown in FIG. 30 represents a P-Q characteristic obtained when the maximum revolution number of the engine 110 is not limited to $N_E$ when the maximum displacement volume is switched to $q_E$.

Figure 31:
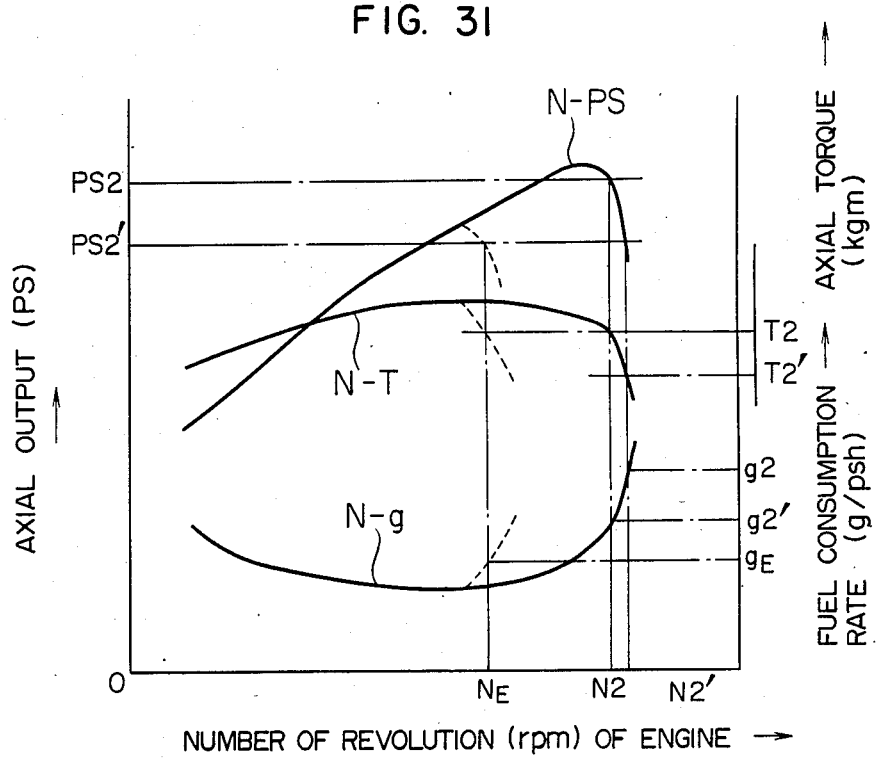
FIG. 31 is a diagrammatic representation of the characteristic of the engine shown in FIG. 27.

In this embodiment, the maximum discharge flow rate of the pump 111 is given with a value $Q_E=Q_P$ by increasing the maximum displacement volume of the pump to $q_E$ ($>q_P$) and reducing the maximum revolution number to $N_E$ ($<N_P$) in the economy mode, so that all the operations including travelling are performed at the same speed. Thus the fuel consumption rate can be reduced to $g_E$ and a required horsepower PS2' can be obtained at the revolution number $N_E$ of the engine as shown in FIG. 31. Meanwhile, let us consider how the maximum speed of 35 km/h set by law in Japan can be achieved when the discharge flow rate of the pump 111 is $Q_P(=Q_E)$. As can be seen in FIG. 30, it is possible for the excavator to travel at the speed of 35 km/h in the economy mode when the pump discharge pressure is P1 (a pressure necessary for travelling on a flat road). However, if the pump discharge pressure exceeds P1 when the excavator moves uphill on sloping roads, for example, it is impossible for the excavator to travel at 35 km/h in the economy mode. In the power mode, however, the excavator is able to travel at the speed of 35 km/h so long as the pump discharge pressure is P2 (a pressure necessary for moving uphill on sloping roads at an angle θ).

Figure 32:
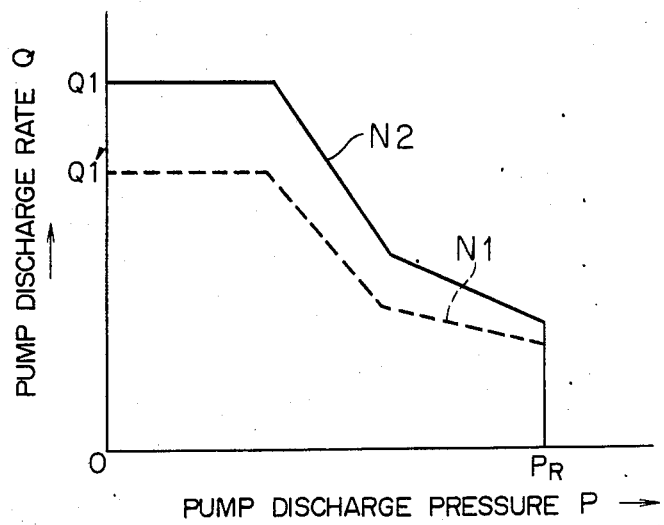
FIG. 32 is a diagrammatic representation of the P-Q characteristic of the hydraulic pump of a hydraulic excavator of the wheel type of the prior art.

If the excavator is equipped with a hydraulic pump and a hydraulic circuit of the prior art, it would be impossible to achieve a predetermined speed if an attempt were made to reduce fuel consumption by reducing the revolution number to N1 and the pump absorption horsepower as is the case with the embodiment shown and described hereinabove, because the maximum displacement volume of the pump remains constant, so that the P-Q characteristic becomes as represented by a broken line curve shown in FIG. 32 and the discharge flow rate of the pump is reduced to Q1'.

In the foregoing description, $q_P$, $N_P$, $q_E$ and $N_E$ in each mode have been set at values in such a manner that the maximum pump discharge flow rates $Q_P$ ($=q_E \times N_E$) and $Q_E$ ($=q_E \times N_E$) are equal to each other. However, they need not be equal to each other so long as they are substantially equal. They may vary from each other so long as a maximum travelling speed of 30-35 km/h can be achieved in each mode. In the foregoing description, the maximum tilting angle altering means for the pump has been described as being controlled by the hydraulic cylinder 115a. However, control may be effected electromagnetically. Also, a linear solenoid may be used or a plurality of hydraulic cylinders may be used to alter the maximum tilting angle in over three stages. When the maximum tilting angle is controlled in the manner described hereinabove, the maximum revolution number of the engine may be given with a plurality of values, so that the engine can operate to enable the excavator to move uphill at varying gradings. This is conducive to further improvement in fuel consumption. The invention can have application in a hydraulic excavator in which the hydraulic pump 111 is driven by an electric motor, not by the engine 110.

In the embodiment shown and described hereinabove, the prime mover and the hydraulic pump can be operated at least in two modes of operation. In an operation range of higher load, the maximum displacement volume of the pump is set at a lower value and the maximum revolution number of the prime mover is also set at a low value, and in an operation range of lower load, the maximum displacement volume of the pump is set at a higher value and the maximum revolution number of the prime mover is set at a lower value. By virtue of this feature, it is possible for the excavator to travel at a desired speed in moving uphill on a sloping road, and it is also possible to obtain in a range of low speed of rotation a pump absorption horsepower necessary for travelling on a flat rode. This is conducive to reduced fuel consumption.

Another embodiment of the control system according to the invention which is incorporated in a hydraulic excavator of the wheel type will be described by referring to FIGS. 33-39.

Figure 33:
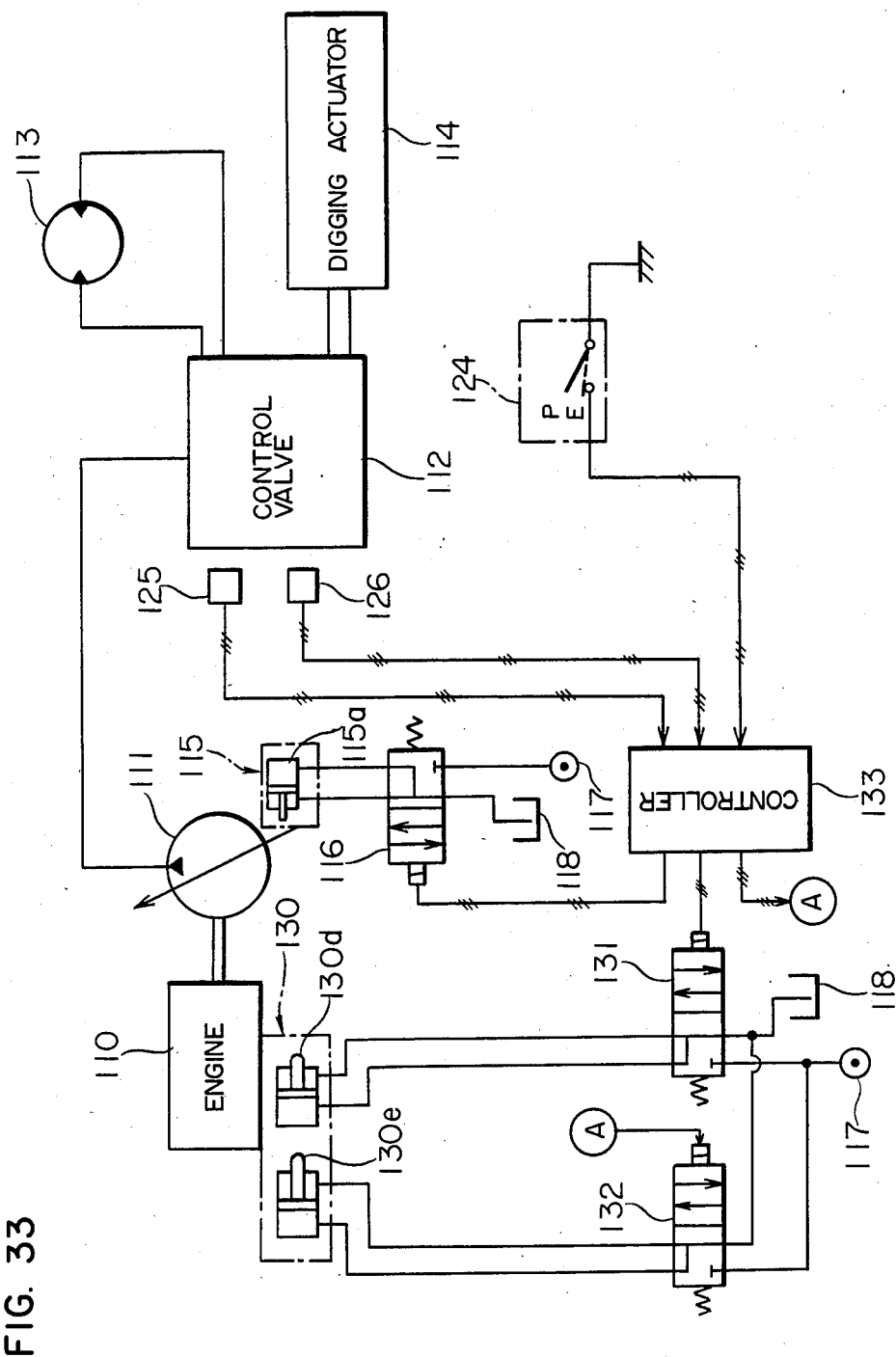
FIG. 33 is a circuit diagram of the control system comprising still another embodiment of the invention.
Figure 34:
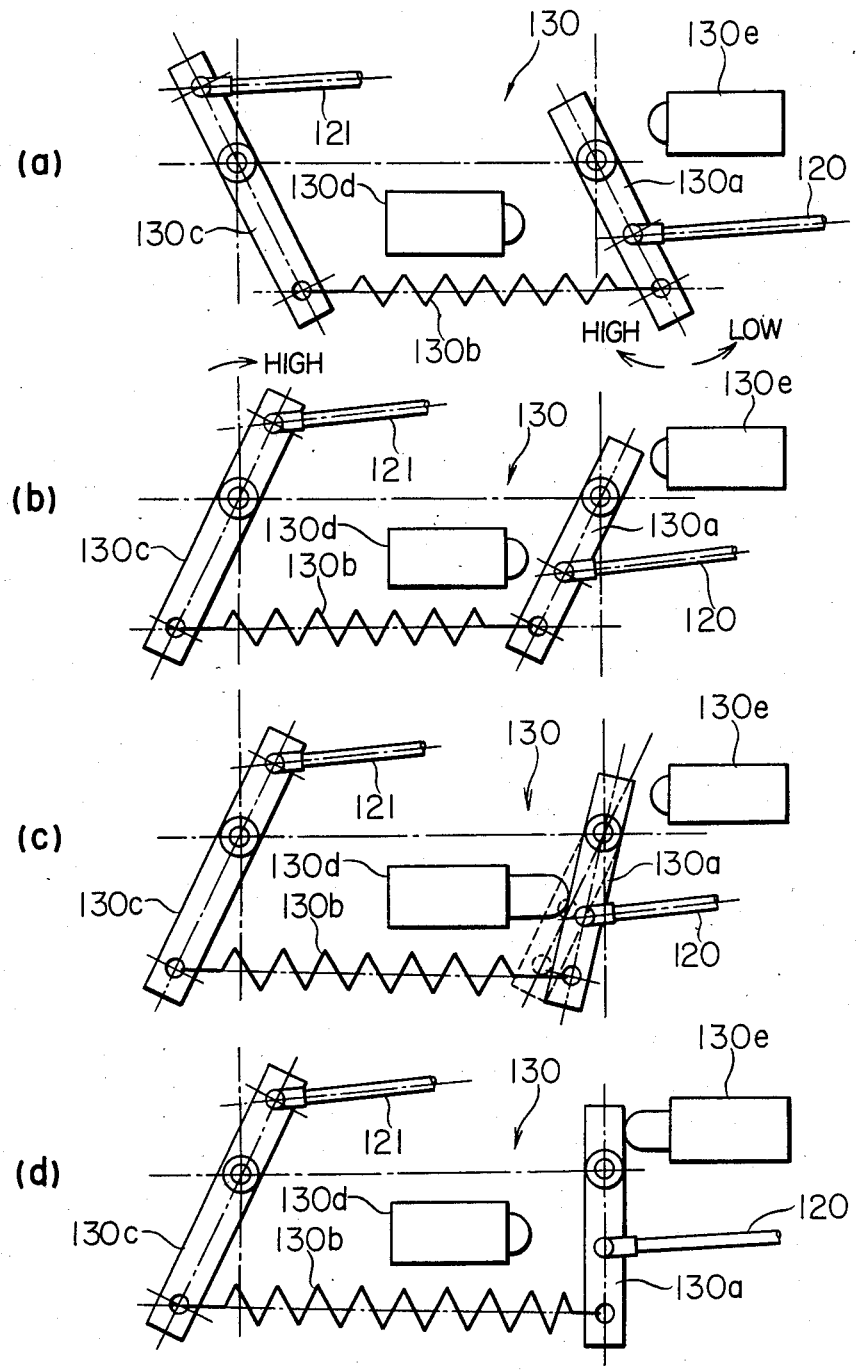
FIGS. 34(a), 34(b), 34(c) and 34(d) are schematic views in explanation of the construction and operation of the maximum revolution number altering means shown in FIG. 33.

FIG. 33 shows the embodiment of the control system together with a hydraulic circuit, in which parts similar to those shown in FIG. 27 are designated by like reference characters. The control system comprises maximum revolution number altering means 130 associated with a governor, not shown, of the engine 110. The maximum revolution number altering means 130 comprises, as shown in FIGS. 34(a) and 34(b), a lever 130a pivotally supported at a predetermined location to which is connected a throttle lever 120 connected to the governor. FIGS. 34(a) and 34(b) show an engine idling state and a full throttle state, respectively. A spring 130b is stretched between a forward end of the lever 130a and one end portion of a lever 130c pivotally supported at a predetermined location. An opposite end portion of the lever 130c is connected to an engine control lever, not shown, mounted in the operator's cab, for example, through a push-pull cable 121. The maximum revolution number altering means 130 further comprises hydraulic cylinders 130d and 130e for controlling the angle of tilting movement of the lever 130a. The hydraulic cylinder 130d controls, as shown in FIG. 34(c), the maximum angle of pivoting movement of the lever 130a to give a value $N_{TE}$ to the maximum revolution number of the engine, and the hydraulic cylinder 130e controls, as shown in FIG. 34(d), the maximum angle of pivoting movement of the lever 130a to give a value $N_D$ to the maximum revolution number of the engine. The hydraulic cylinder 130d is connected to the pressure source 117 and reservoir 118 through an electromagnetic valve 131. The hydraulic cylinder 130e is connected to the pressure source 117 and reservoir 118 through an electromagnetic valve 132.

Referring to FIG. 33 again, the reference numeral 133 designates a controller which may be a microcomputer, for example. The controller 133 has an input port to which are connected a mode control switch 124 constituting selection means, a travel sensor 125 and a digging sensor 126.

Connected to an output port of the controller 133 are an electromagnetic valve 116 connected to a maximum tilting angle setting hydraulic cylinder 115a, an electromagnetic valve 131 connected to the engine revolution number limiting hydraulic cylinder 130d and an electromagnetic valve 132 connected to the engine revolution number limiting hydraulic cylinder 130e.

The electromagnetic valves 116, 131 and 132 are controlled in accordance with a program shown in FIG. 35 as subsequently described. The electromagnetic valves 116 and 131 respond to the position of the mode control switch 124. That is, when the mode control switch 124 is located in a power mode position, the electromagnetic valve 115 is energized and the electromagnetic valve 131 is de-energized, and when the mode control switch 124 is in an economy mode position, the electromagnetic valve 116 is de-actuated and the electromagnetic valve 131 is energized. When the digging lever is actuated in the power mode, the electromagnetic valve 116 is de-energized. The electromagnetic valve 132 is energized in response to the actuation of the digging lever to thereby limit the maximum revolution number of the engine to $N_D$.

The program stored in a read-only memory (ROM) of the controller 133 will now be described.

Figure 35:
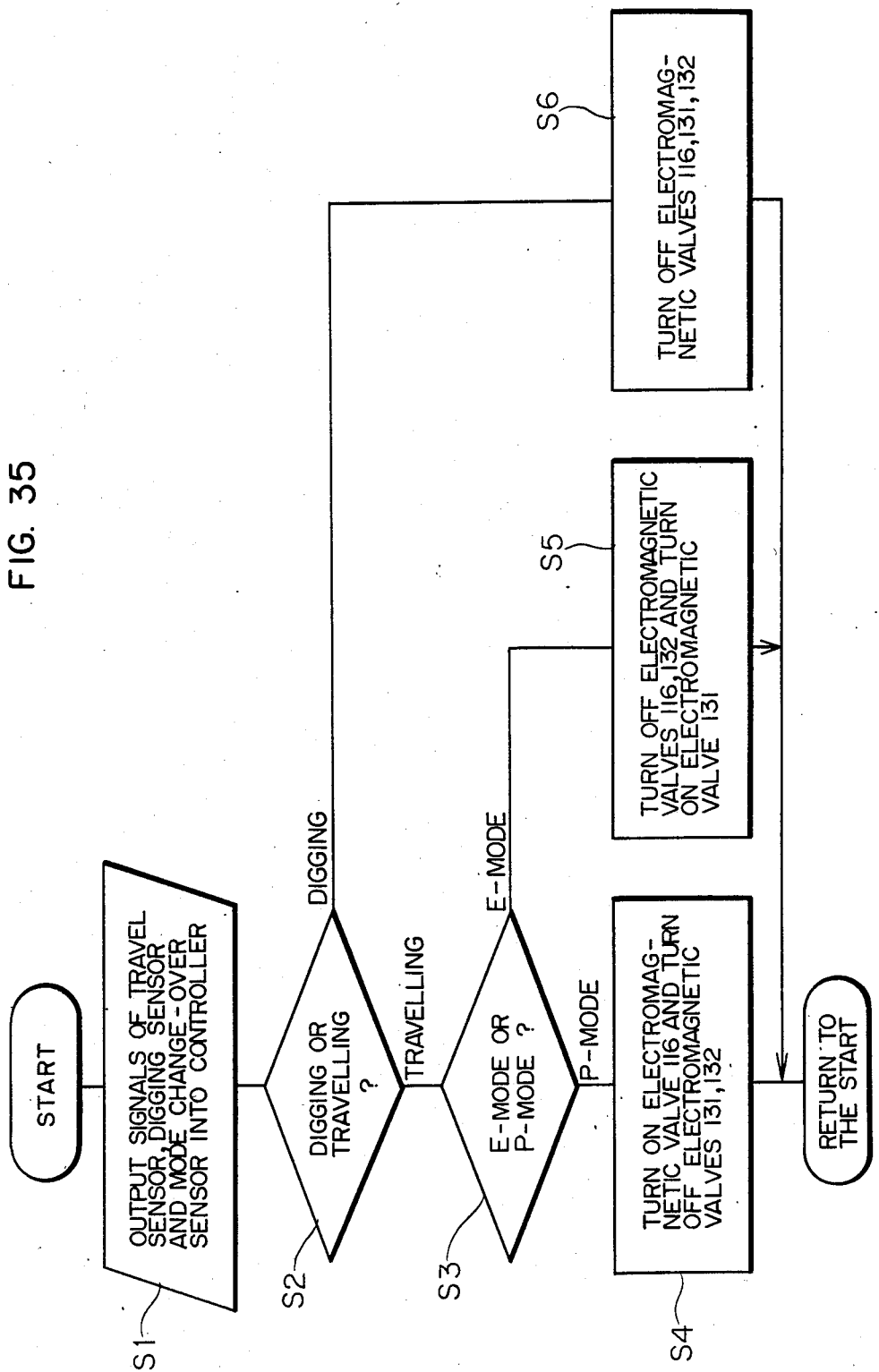
FIG. 35 is a flow chart in explanation of the operation performed by the controller shown in FIG. 33.

FIG. 35 shows one example of the program for controlling the three electromagnetic valves 116, 131 and 132. In step S1, the working condition and operation mode are read based on signals from the travel sensor 125, digging sensor 126 and mode control switch 124.

In step S2, digging or travelling is determined based on the signals from the sensors 125 and 126. When a digging operation is determined, the operation moves to step S6 in which the electromagnetic valves 116 and 131 are de-energized and the electromagnetic valve 132 is energized. When travelling is determined in step S2, the operation moves to step S3 in which the position of the mode control switch 124 is determined. When the power mode is selected, the operation moves to step S4. When the economy mode is selected, the operation moves to step S5. In step S4 (travelling, power mode), the electromagnetic valve 116 is energized and electromagnetic valves 131 and 132 are de-energized. In step S5 (travelling, economy mode), the electromagnetic valve 116 is de-energized and electromagnetic valves 131 and 132 are energized.

Operation of the embodiment of the aforesaid construction will now be described.

(1) Power-Mode Operation

In this invention, the power-mode operation can be performed only when the excavator is travelling. If a digging operation is performed while the mode control switch 124 is in the power-mode position, the operation is automatically switched to the economy mode in which the maximum tilting angle or the maximum displacement volume increases (displacement volume $q_E$) and the maximum revolution number of the engine is limited to $N_D$. Thus, the following description will be made by assuming that the travel lever has been actuated.

As the mode control switch 124 is shifted to the power-mode position, the maximum tilting angle setting electromagnetic valve 116 is energized and the maximum tilting angle setting hydraulic cylinder 115a is communicated with the pressure source 117. This renders the maximum tilting angle altering means 115 operative, so that the maximum tilting angle is set at a value corresponding to the displacement volume $q_P$. At this time, the maximum engine revolution number setting electromagnetic valves 131 and 132 are de-energized and the hydraulic cylinders 130d and 130e are both inoperative. Thus, by fully pulling the engine control lever in the operator's cab, it is possible to let the engine rotate at a maximum revolution number $N_{TP}$ as shown in FIG. 34(b).

Figure 36:
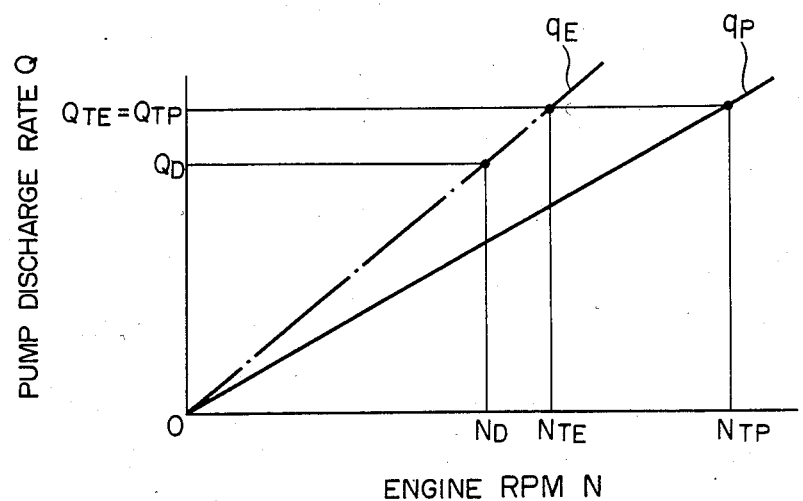
FIG. 36 is a diagrammatic representation of the combination of maximum revolution number of the engine and maximum displacement volume of the hydraulic pump set in the controller shown in FIG. 33.
Figure 37:
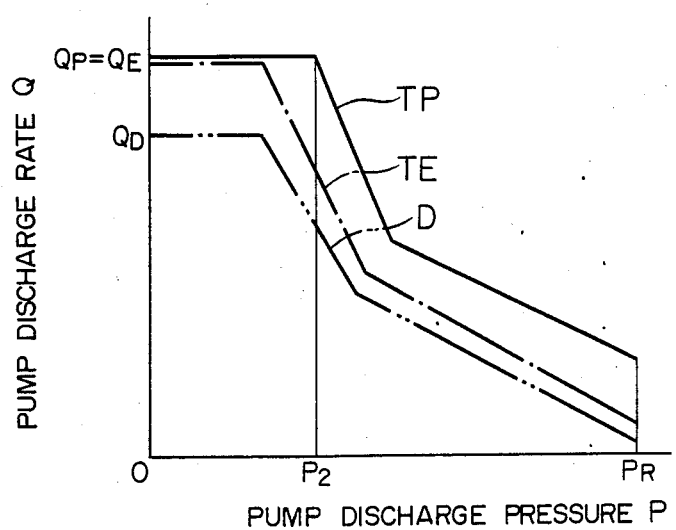
FIG. 37 is a diagrammatic representation of the relation between the discharge pressure (P) and the discharge rate (Q) of the hydraulic pump provided by the control system shown in FIG. 33.

So long as the tilting angle of the hydraulic pump 111 is maximized and the displacement volume is $q_P$ in a low pressure region (under the pressure P2 in FIG. 37), the pump discharge flow rate rises in proportion to an increase in engine revolution number as indicated by a solid line in FIG. 36, thereby providing a maximum pump discharge flow rate $Q_{TP}$ at the maximum revolution number $N_{TP}$ of the engine. In this case, the P-Q characteristic of the pump at the engine revolution number $N_{TP}$ is as indicated by a solid line TP in FIG. 37.

(2) Economy-Mode Operation

As the mode control switch 124 is shifted to the economy-mode position, the maximum tilting angle setting electromagnetic valve 116 is de-energized and the maximum tilting angle setting hydraulic cylinder 115a is communicated with the reservoir 118, thereby actuating the maximum tilting angle altering means 115 to set the maximum tilting angle at a value corresponding to the displacement volume $q_E$ ($>q_P$). In this embodiment, the maximum revolution number of the engine in the economy mode is varied in response to the digging or travelling. Thus, in accordance with the program shown in FIG. 35, when digging is performed, the revolution number setting electromagnetic valve 131 is de-energized and the revolution number setting electromagnetic valve 132 is energized to drive the hydraulic cylinder 130e to set the maximum revolution number at $N_D$ [see FIG. 34(d)], and when travelling is performed, the electromagnetic valve 131 is energized and the electromagnetic valve 132 is de-energized to drive the hydraulic cylinder 130d to set the maximum revolution number at $N_{TE}$ [see FIG. 34(c)]. Even if the engine control lever in the operator's cab is fully pulled, the pivoting movement of the lever 130a is restricted by the cylinder as shown in FIG. 34(c) or (d), so that the maximum revolution number of the engine is limited to $N_D$ ($<N_{TE}$), $N_{TE}$ ($<N_{TE}$) or $N_{TE}$ ($<N_{TP}$).

Thus, so long as the tilting angle of the swash plate of the hydraulic pump 111 is maximized and the displacement volume is $q_E$ in the lower pressure range, the pump discharge flow rate rises in proportion to an increase in the revolution number of the engine as indicated by a dash-and-dot line in FIG. 36. This provides a maximum discharge flow rate $Q_{TE}$ ($=Q_{TP}$) at maximum revolution number of the engine $N_{TE}$ on travelling and a maximum discharge flow rate $Q_D$ ($<Q_{TE}$) at revolution number of the engine $N_D$ on digging. In this case, the P-Q characteristic of the pump is as indicated by a dash-and-dot line TE shown in FIG. 37 which is obtained on travelling and by a dash-and-dot line D shown in FIG. 37 which is obtained on digging. The relation of the maximum displacement volumes corresponding to the maximum tilting angles in the power mode and in the economy mode is $q_E > q_P$. In order to keep the maximum pump discharge flow rates on travelling equal $Q_{TE}=Q_{TP}$, the maximum revolution number of the engine is suitably reduced in the economy mode for travelling to achieve the same maximum speed in the power mode and economy mode. As a result, a required horsepower S2' is obtained at the revolution number of the engine being $N_{TE}$ as shown in FIG. 38, thereby reducing the fuel consumption rate of $g_{TE}$.

Accordingly, in the case of reducing fuel consumption by reducing the revolution number of the engine to decrease pump absorption horsepower in a pump of a prior art hydrualic circuit as is the case with this embodiment, the P-Q characteristic becomes in the broken line in FIG. 32 referred to hereinabove was obtained. This causes a reduction in the pump discharge flow rate, making it impossible to obtain a predetermined travelling speed or a desired digging operation speed.

Figure 38:
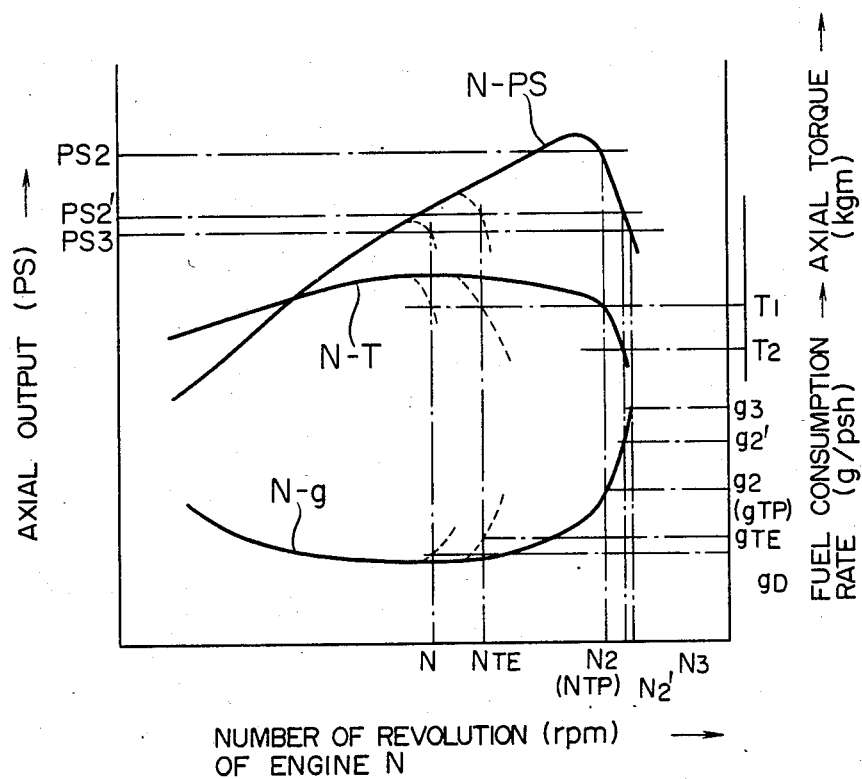
FIG. 38 is a diagrammatic representation of the characteristic of the engine shown in FIG. 33.

As can be seen in FIG. 38, the maximum revolution number of the engine for digging operations is set at $N_D$ which enables a required horsepower PS3 to be provided to perform digging operations. This provides a fuel consumption rate $g_D$ ($<g_3$) If, for example, digging operations were performed at the maximum revolution number of the engine with remaining the maximum tilting angle for the power mode, the revolution number of the engine and the fuel consumption rate would rise to N3 and $g_3$ respectively. As compared with this, the embodiment shown and described hereinabove provides a marked improvement in fuel consumption. It would be apparent that this is conducive to reduce noise production.

In the foregoing description, the pump discharge flow rates $Q_{TP}$ and $Q_{TE}$ have been described as becoming equal to each other in the two modes when travelling takes place. These two values need not be strictly equal to each other and they may be substantially equal to each other as is the case with the embodiment shown in FIG. 33. Also, in the foregoing description, the maximum tilting angle altering means for the pump has been described as being controlled by the hydraulic cylinder 115a, but the invention is not limited to this specific form of control and any other known suitable means may be used instead. This is also the same as the case with the embodiment shown in FIG. 33.

In the foregoing description, the maximum discharge flow rate $Q_{TE}$ for travelling in the economy mode has been described as being made higher than the maximum discharge flow rate $Q_D$ for digging operations. However, $Q_D$ may be $Q_D=Q_{TE}$ or $Q_D>Q_{TE}$ depending on the diameter of the cylinders for the front attachments, the capacity of the travel motors and the gear ratio.

What is important is that, when digging operations are performed, the maximum tilting angle of the swash plate is set at a higher value corresponding to the maximum displacement volume $q_E > (q_P)$ of the hydraulic pump in this embodiment.

Figure 39:
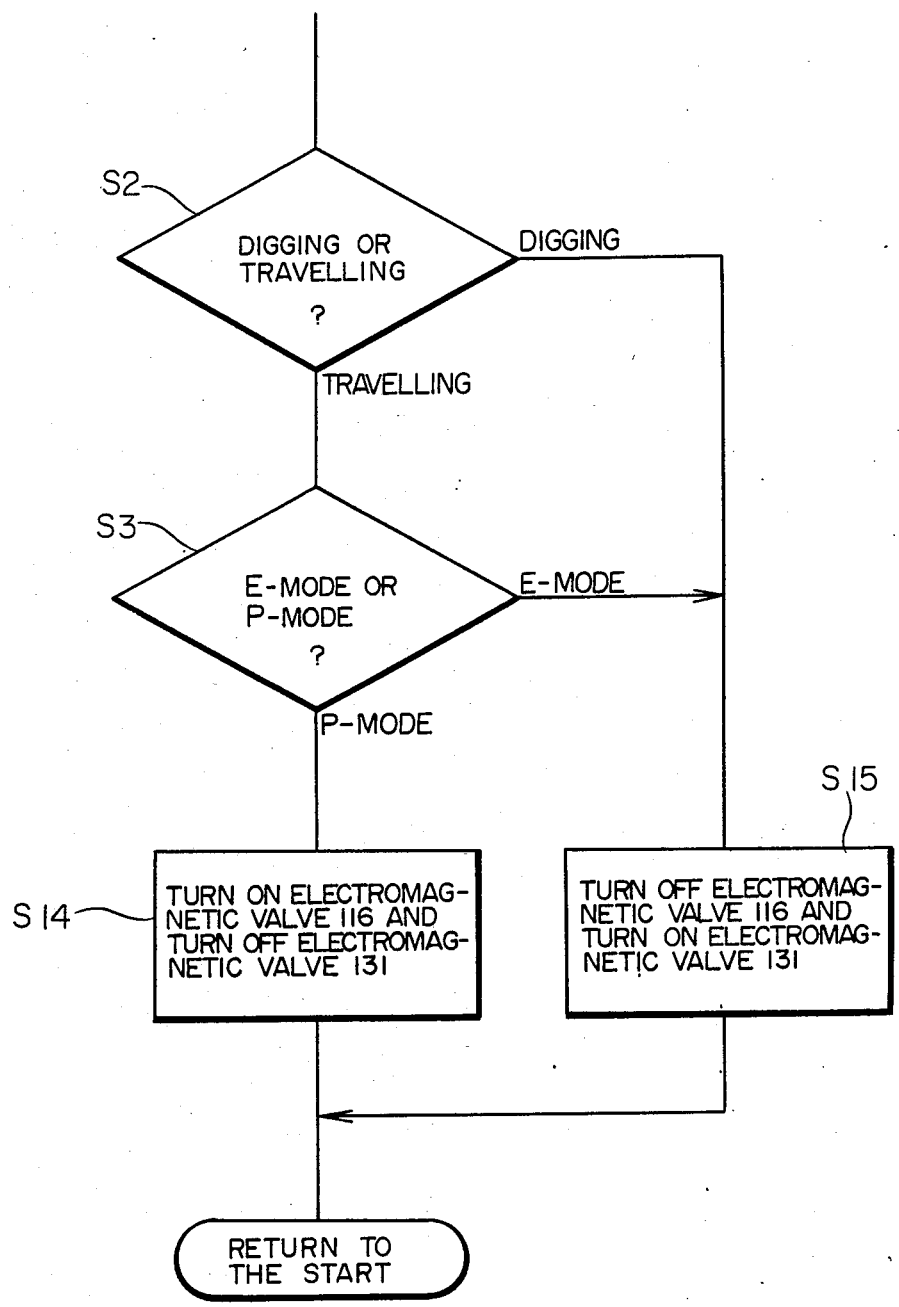
FIG. 39 is a flow chart in explanation of a modification of the operation performed by the controller shown in FIG. 33.

When $Q_D = Q_{TE}$, the maximum revolution number of the engine for travelling in the economy mode and for digging operations is $N_{TE} = N_D$. In this case, the hydraulic cylinder 130e can be omitted, thereby reducing the number of the parts. FIG. 39 shows an example of the program used in this case.

In the embodiment shown and described hereinabove, the prime mover and the hydraulic pump are programmed to operate in two operation modes, namely, in the power mode and economy mode. In a high load travelling range, the maximum displacement volume of the pump is set at a small value and the maximum revolution number of the prime mover is set at a large value. In a low load travelling range, the maximum displacement volume of the pump is set at a large value and the maximum revolution number of the prime mover is set at a suitable value. In performing digging operations, the maximum displacement volume of the pump is set at a value greater than the maximum displacement volume of the pump for the high load travelling range, and the maximum revolution number of the prime mover is set at a value smaller than the maximum revolution number of the prime mover for the high load travelling range. Thus, even if the engine is set to develop a desired speed when the excavator moves uphill on a sloping road, it is possible to obtain in a low engine speed range a pump absorption horsepower necessary for travelling on a flat road. This is conducive to improve fuel consumption as compared with the prior art. Also, digging operations can be performed in the low engine speed range commensurate with the required pump absorption horsepower, so that the fuel consumption rate and the noise produced by the engine can be kept at a low level. Since the maximum displacement volume of the pump is kept at a large value, the desired operation speed can be maintained.

What is claimed is:

1. A control system for a hydraulically-operated construction machinery comprising a prime mover, means for controlling the revolution number of said prime mover, at least one variable displacement hydraulic pump driven by said prime mover, means for controlling the displacement volume of said pump, a plurality of actuators driven by pressurized fluid discharged from the pump and a plurality of working elements driven by the respective actuators, said control system comprising:

means associated with said revolution number control means for altering the maximum revolution number of said prime mover;

means associated with said displacement volume control means for altering the maximum displacement volume of the pump;

means for sensing the operation condition of the actuators;

means for selecting an operation mode for each working element;

the maximum revolution number altering means providing at least one maximum revolution number of the prime mover and the maximum displacement volume altering means providing at least one maximum displacement volume so that maximum revolution numbers of the prime mover and maximum displacement volumes of the pump are arranged in a plurality of combinations, said plurality of combinations being set in association with the operation condition of the actuators and the selection of the operation mode; and control means for selecting a combination of the maximum revolution number and the maximum displacement volume on basis of output signals of said sensor means and selection means and driving the maximum revolution number altering means and the maximum displacement volume altering means to set the maximum revolution number of the prime mover and the maximum displacement volume of the hydraulic pump to the contents of the selected combination.

2. A control system as claimed in claim 1, wherein said selection means is manually operated.

3. A control system as claimed in claim 1, wherein said working elements comprise left and right travel devices and other working elements than said travel devices, wherein said sensor means comprises first sensor means for sensing the operation condition of travel motors for driving said travel devices, and second sensor means for sensing the operation condition of other actuators than the travel motors for driving other working elements, wherein said selection means comprises first selection means for selecting one of a power mode and an economy mode for other working elements than the travel devices, and second selection means for selecting one of a high-speed travelling mode and a low-speed travelling mode for the travel devices, wherein said plurality of combinations are set beforehand in association with the operation condition of the travel motors and other actuators and the selection of the power mode, economy mode, high-speed travelling mode and low-speed travelling mode and include a first combination of a first maximum revolution number of the prime mover and a first maximum displacement volume of the pumps both having a relatively large value, a second combination of the first maximum revolution number of the prime mover and a second maximum displacement volume of the pumps smaller than the first maximum displacement volume, a third combination of a second maximum revolution number of the prime mover smaller than the first maximum revolution number and the first maximum displacement volume of the pumps, and a fourth combination of the second maximum revolution number of the prime mover and the second maximum displacement volume, and wherein said control means selecting one of said four combinations on the basis of output signals of the first and second sensor means and the first and second selection means.

4. A control system as claimed in claim 3, wherein said control means selects, when the travel motors are in operation, one of the first, third and fourth combinations in accordance with the operation mode selected by the second selection means irrespective of the operation condition of other actuators than the travel motors, and selects, when other actuators than the travel motors are in operation, one of the second and third combinations on the basis of the operation mode selected by the first selection means.

5. A control system as claimed in claim 3, wherein said working elements further comprise a breaker for crushing rocks and stones, wherein said sensor means further comprises third sensor means for sensing the operation condition of an actuator for driving the breaker, and said first combination is set beforehand in association with the operation condition of the actuator for driving the breaker, and said control means selects the first combination on the basis of output signals of the third sensor means and the first and second selection means.

6. A control system as claimed in claim 3, wherein said control means comprises a first determining means for determining with priority whether or not the travel motors are in operation on the basis of an output signal of the first sensor means, and a second determining means for determining, only when the travel motors have been determined by the first determining means not to be in operation, whether or not other actuators than the travel motors are in operation on the basis of an output signal of the second sensor means, and selects one of the combinations on the basis of the determinations made by the first and second determining means and output signals of the first and second sensor means.

7. A control system as claimed in claim 6, wherein said control means further comprises a third determining means for determining whether or not the first selection means is actuated after it is determined by the second determining means that other actuators than the travel motors are not in operation, and selects the same combination as selected when it is determined by the second determining means that other actuators than the travel motors are in operation when it is determined by the third determining means that the first selection means is actuated.

8. A control system as claimed in claim 6, wherein said control means further comprises measuring means for measuring the time period after it is determined by the second determining means that other actuators than the travel motors are not in operation, and a third determining means for determining whether or not the period of time after the determination has been made reaches a predetermined period of time on the basis of an output signal of the measuring means, and selects the same combination as selected when it is determined by the second determining means that other actuators than the travel motors are in operation when it is determined by the third determining means that the predetermined period of time has not elapsed.

9. A control system as claimed in claim 6, wherein said selection means further comprises a third selection means for selecting whether or not the prime mover should be placed in an automatic idling mode, and wherein a fifth combination of a third maximum revolution number of the prime mover for idling operation smaller than the second maximum revolution number of the prime mover and the second maximum displacement volume is set beforehand in association with the operation condition of the travel motors and other actuators, and wherein said control means further comprises a third determining means for determining whether or not an automatic idling mode is selected by the third selection means after it is determined by the second determining means that other actuators than the travel motors are not in operation, and selects the fifth combination when it is determined by the third determining means that the automatic idling mode is selected and selects the same combination as selected when it is determined by the second determining means that other actuators than the travel motor are in operation when it is determined by the third determining means that the automatic idling made is not selected.

10. A control system as claimed in claim 1, wherein said working elements comprise left and right travel devices and other working elements than the travel devices, wherein said sensor means senses the operation condition of at least one of travel motors for driving said travel devices and other actuators than the travel motors for driving other working elements, wherein said selection means selects a high-speed travelling mode or a low-speed travelling mode for the travel devices, wherein a first combination of a first maximum revolution number of the prime mover and a first maximum displacement volume of the pumps both of relatively large value, a second combination of the first maximum revolution number of the prime mover and a second maximum displacement volume of the pumps smaller in value than the first maximum displacement volume of the pumps and a third combination of a second maximum revolution number of the prime mover smaller in value than the first maximum revolution number of the prime mover and the second maximum displacement volume of the pumps are set beforehand in association with the operation condition of at least the travel motors and other actuators and the selection of the high-speed travelling mode and the low-speed travelling mode, and wherein said control means selects, on the basis of output signals of the sensor means and selection means, the first combination when the travel motors only are in operation and the high-speed travelling mode is selected, the third combination when the travel motors only are in operation and the low-speed travelling mode is selected, and the second combination when other actuators than the travel motors only are in operation.

11. A control system as claimed in claim 1, wherein said working elements comprise travel devices and other working elements than the travel devices, wherein said selection means selects a power mode or an economy mode of said travel devices wherein a first combination of a first maximum revolution number of the prime mover relatively large value and a second maximum displacement volume of the pumps smaller in value than a first maximum displacement volume of the pumps relatively large value and a second combination of a second maximum revolution number of the prime mover smaller in value than the first maximum revolution number of the prime mover and the first maximum displacement volume of the pumps are set beforehand in association with the selection of the power mode or the economy mode, and wherein said control means selects, on the basis of an output signal of the selection means, the first combination when the power mode is selected and the second combination when the economy mode is selected.

12. A control system as claimed in claim 11, wherein said sensor means comprises first sensor means for sensing the operation condition of travel motors for driving the travel devices and second sensor means for sensing the operation condition of other actuators than the travel motors for driving other working elements wherein the first and second combinations are set beforehand in association with the operation condition of the travel motors and other actuators, and wherein said control means selects, on the basis of output signals of the first and second sensor means and the selection means, the first combination when the travel motors are in operation and the power mode is selected and the second combination when the travel motors are in operation and the economy mode is selected and other actuators than the travel motors are in operation.

13. A control system as claimed in claim 12, wherein a third combination of a third maximum revolution number of the prime mover smaller in value than the second maximum revolution number of the prime mover and the first maximum displacement volume of the pumps is set beforehand in association with the operation condition of other actuators than the travel motor, and wherein said control means selects the second combination when the travel motors are in operation and the economy mode is selected and the third combination when other actuators than the travel motors are in operation.

* * * * *